United States Patent
Jacobs et al.

(10) Patent No.: US 11,132,630 B1
(45) Date of Patent: Sep. 28, 2021

(54) EMPLOYEE SCHEDULING SYSTEM PROVIDING TRANSPARENCY

(71) Applicant: AMERICAN AIRLINES, INC., Fort Worth, TX (US)

(72) Inventors: Timothy L. Jacobs, Tempe, AZ (US); Hadi W. Purnomo, Phoenix, AZ (US); Owen D. Perrine, Scottsdale, AZ (US); Craig Endres, Goodyear, AZ (US); Richard Till, Phoenix, AZ (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 232 days.

(21) Appl. No.: 15/468,475

(22) Filed: Mar. 24, 2017

Related U.S. Application Data

(63) Continuation of application No. 15/445,668, filed on Feb. 28, 2017, now abandoned.

(60) Provisional application No. 62/301,038, filed on Feb. 29, 2016.

(51) Int. Cl.
*G06Q 10/06* (2012.01)

(52) U.S. Cl.
CPC .......................... *G06Q 10/063116* (2013.01)

(58) Field of Classification Search
CPC ... G06Q 10/063116; G06Q 10/063112; G06Q 10/06312; G06Q 10/063118
See application file for complete search history.

(56) References Cited

U.S. PATENT DOCUMENTS

| | | | |
|---|---|---|---|
| 7,346,528 B2* | 3/2008 | Thengvall | G06Q 10/02 705/7.21 |
| 7,725,339 B1* | 5/2010 | Aykin | G06Q 10/10 705/7.14 |
| 2005/0096962 A1* | 5/2005 | Narasimhan | G06Q 10/063116 705/7.16 |
| 2008/0040193 A1* | 2/2008 | Dion | G06Q 10/1093 705/7.14 |
| 2008/0215407 A1* | 9/2008 | Pachon | G06Q 10/06 705/7.16 |
| 2008/0215408 A1* | 9/2008 | Pachon | G06Q 10/06 705/7.16 |
| 2008/0319822 A1* | 12/2008 | LaJoie | G06Q 10/06 705/7.16 |
| 2014/0058954 A1* | 2/2014 | Perlstein | G06Q 10/1053 705/80 |

(Continued)

Primary Examiner — Matthew S Gart
Assistant Examiner — Stephen S Swartz
(74) Attorney, Agent, or Firm — Haynes and Boone, LLP

(57) ABSTRACT

A system and method of generating an transparent optimized shift schedule for a plurality of crew members that includes receiving a plurality of shift bids from the plurality of crew members, with each of the shift bids to be either classified as awarded or rejected, optimizing the transparent optimized shift schedule; and presenting, to each crewmember from the plurality of crewmembers who submitted a shift bid classified as a rejected shift bid, the reason code associated with his or her rejected shift bid; wherein presenting, to each crewmember from the plurality of crewmembers who submitted a shift bid classified as a rejected shift bid, his or her shift assignment from the optimized shift schedule and a reason code associated with his or her rejected shift bid provides transparency as to why each rejected shift bid was rejected.

14 Claims, 14 Drawing Sheets

(56) References Cited

U.S. PATENT DOCUMENTS

2014/0257900 A1* 9/2014 Jacobs ............ G06Q 10/063116
                                                                                                     705/7.16
2016/0379156 A1* 12/2016 Pike ............... G06Q 10/063116
                                                                                                     705/7.16

* cited by examiner

EMPLOYEE SCHEDULING SYSTEM PROVIDING TRANSPARENCY

CROSS-REFERENCE TO RELATED APPLICATIONS

This application is a continuation of U.S. application Ser. No. 15/445,668, filed Feb. 28, 2017, which claims the benefit of the filing date of, and priority to, U.S. Application No. 62/301,038, filed Feb. 29, 2016, the entire disclosures of which are hereby incorporated herein by reference.

BACKGROUND

In the technology of employee shift scheduling processing, employees may submit a request to work certain days or shifts and/or submit a request to not work certain days or shifts. An overall system solution, or schedule, is then generated using a processor with some of the employee submittals being granted and others being denied. When the schedule is generated using an algorithm, the goal or objective of the algorithm is to maximize or minimize selected parameters (e.g., total coverage of all shifts, minimize employees that have no assigned shifts, etc.). While the schedule may meet the goal or objective, no reasons are provided as to why one specific employee's request was denied or awarded. This may result in a decrease in the employee's satisfaction with the schedule.

Therefore, what is needed is a system, method, or apparatus that addresses one or more of the foregoing issues, and/or one or more other issues.

DETAILED DESCRIPTION

Figure 1:
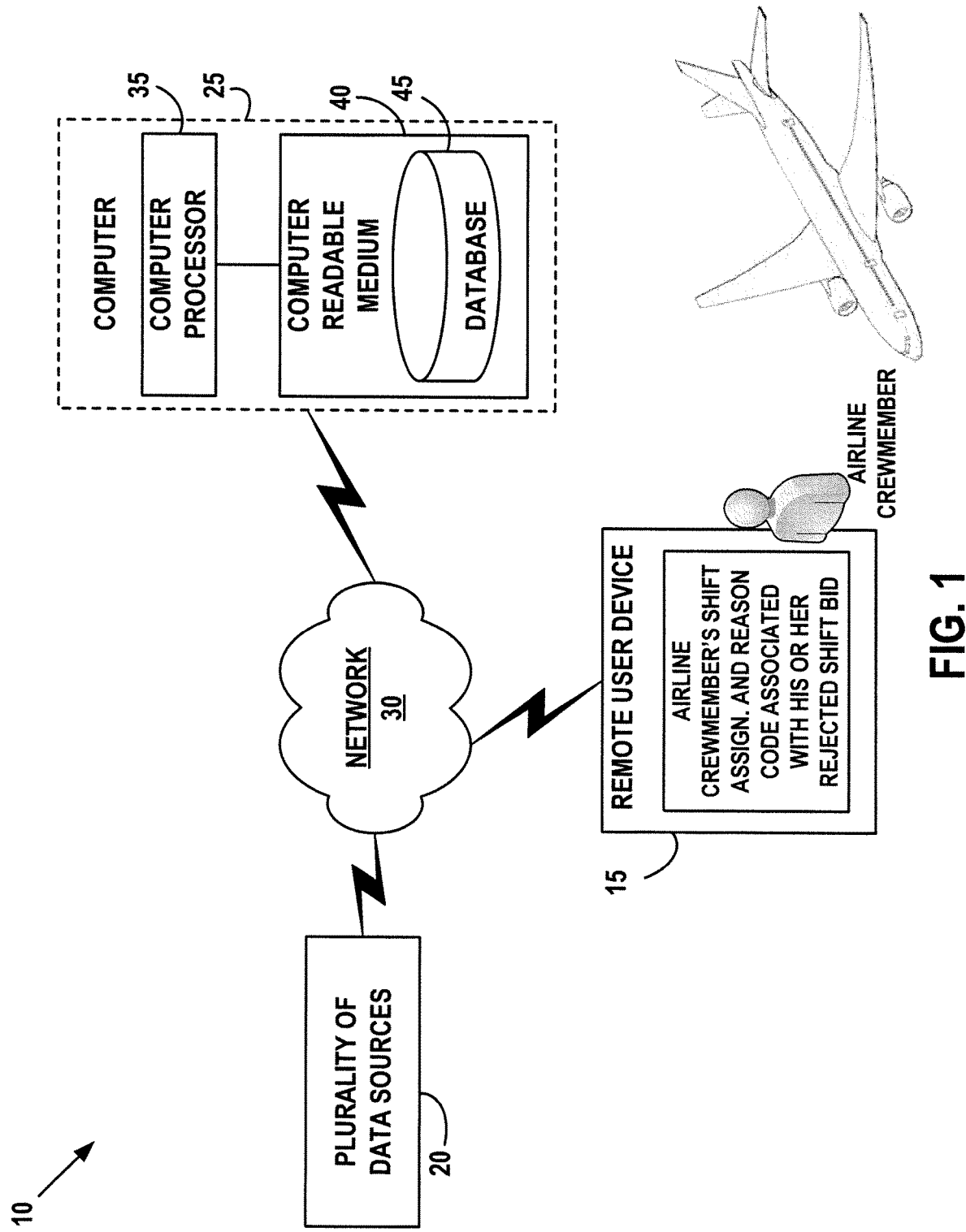
FIG. 1 is a diagrammatic illustration of a system according to an exemplary embodiment, the system including a plurality of data sources and a remote user device.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A system generally referred to by the reference numeral 10 as illustrated in FIG. 1 provides an employer or scheduler with an orderly process for covering shifts, such as pairings (i.e., a series of flight segments that fall between check-in and check-out at a flight attendant's domicile) and On-Premise-Reserve ("OPR") shifts (i.e., standby shifts, that require a crewmember to report to the airport without a specific flight assignment for the purpose of covering a pairing in order to prevent a delay) which remain open, subject to the number of employees or crewmembers who are available to work, or fly, without violating predetermined rules. In an exemplary embodiment and when scheduling, the system 10 seeks to maximize the covering of open time (i.e., portions of a schedule to which no crewmembers have been assigned) while minimizing disruption to crewmember days off (i.e., moveable days), considering both crewmember seniority and bids, and legality rules. Generally, the system 10 is used to determine a schedule for "reserve" employees or crewmembers, which adhere to "Reserve" sections of a collective bargain agreement or CBA. A reserve employee or reserve flight attendant is one who does not hold a regular flying assignment and whose function is to be available to back-up regular schedules and to perform any open and/or reserve flying not flown by regularly assigned flight attendants. Generally, reserve flight attendants have no choice in assignment to specific trips. Flights attendants, or crewmembers, can be generally classified as a LODO reserve; a general reserve; a general volunteer; or a LODO volunteer. The flight attendants submit bids, via a Crew Portal web site, which is an access point that allows crewmembers to interact with company business processes. Generally, a LODO reserve is a reserve that satisfies a foreign language requirement or qualification, such as being able to speak Spanish or German, and is required to participate in the scheduling of unassigned shifts; a general reserve is a reserve that does not satisfy a foreign language requirement or qualification and is required to participate in the scheduling of unassigned shifts; a general volunteer is a flight attendant that does not satisfy a foreign language requirement or qualification and is not required to be assigned an unassigned shift, but chooses to participate in the scheduling of unassigned shifts via the system 10; and a volunteer LODO is a flight attendant that satisfies a foreign language requirement or qualification and is not required to be assigned an unassigned shift, but chooses to participate in the scheduling of unassigned shifts via the system 10. In some embodiments, each of a LODO reserve and a LODO volunteer is considered a foreign language crewmember.

In an exemplary embodiment, as illustrated in FIG. 1, the system 10 includes one or more remote user device 15; a plurality of data sources 20; and a computer 25 that are operably coupled together, and in communication via a network 30. Generally, the computer 25 includes a computer processor 35 and a computer readable medium 40 operably coupled thereto. Instructions accessible to, and executable by, the computer processor 35 are stored on the computer readable medium 40. A database 45 is also stored in the computer readable medium 40.

Figure 2:
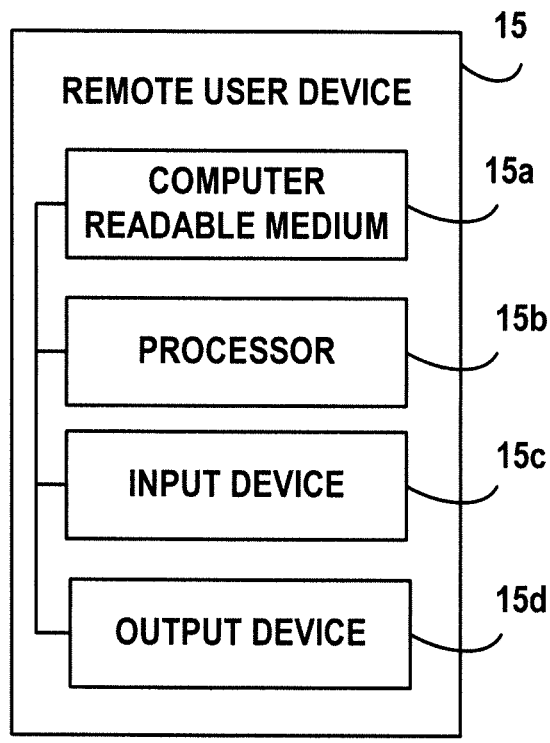
FIG. 2 is a diagrammatic illustration of the remote user device of FIG. 1, according to an exemplary embodiment.

In an exemplary embodiment, as illustrated in FIG. 2 with continuing reference to FIG. 1, the remote user device 15 includes a computer readable medium 15a, a processor 15b, an input device 15c, and an output device 15d. In an exemplary embodiment, instructions accessible to, and executable by, the processor 15b are stored in the computer readable medium 15a. In an exemplary embodiment, the input device 15c is a keyboard, mouse, microphone, or other device coupled to the remote user device 15 that sends instructions to the remote user device 15. In an exemplary embodiment, the input device 15c and the output device 15d include a graphical display, which, in several exemplary embodiments, is in the form of, or includes, one or more digital displays, one or more liquid crystal displays, one or more cathode ray tube monitors, and/or any combination thereof. In an exemplary embodiment, the output device 15d includes a graphical display, a printer, a plotter, and/or any combination thereof. In an exemplary embodiment, the input device 15c is the output device 15d, and the output device 15d is the input device 15c. In several exemplary embodiments, the remote user device 15 is a thick client. In several exemplary embodiments, the remote user device 15 functions as both a thin client and a thick client. In several exemplary embodiments, the remote user device 15 is, or includes, a telephone, a personal computer, a personal digital assistant, a cellular telephone, other types of telecommunications devices, other types of computing devices, and/or any combination thereof. In several exemplary embodiments, the remote user device 15 includes a plurality of remote user devices. In an exemplary embodiment, web browser software is stored in the computer readable medium 15a.

In an exemplary embodiment, the computer 25 is a computing device and also includes an input device and an output device similar to the input device 15c and the output device 15d of the remote user device 15. However, any type of input device and output device may be used. In several exemplary embodiments, the computer 25 is a thin client. In several exemplary embodiments, the computer 25 is a thick client. In several exemplary embodiments, the computer 25 functions as both a thin client and a thick client. In an exemplary embodiment, the computer 25 is capable of running or executing an application or software program relating to Reserve Open Time Award ("ROTA"). In one or more exemplary embodiments, the application is an application server, which in several exemplary embodiments includes and/or executes one or more web-based programs, Intranet-based programs, and/or any combination thereof. In an exemplary embodiment, the application includes a computer program including a plurality of instructions, data, and/or any combination thereof. In an exemplary embodiment, the application is written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the application a web-based application written in, for example, Java or Adobe Flex, which pulls real-time information from another computer and/or the plurality of data sources 20. In an exemplary embodiment, the application pulls real-time information from the plurality of data sources 20, upon the execution, opening or start-up of the application. In an exemplary embodiment, the application is stored on the computer readable medium 40 and/or in the database 45. In an exemplary embodiment, the computer 25 may include a specially designed code, such as for example SAS code and/or UNIX. In an exemplary embodiment, the SAS code allows communication with an external database, such as a database associated with one or more of the plurality of data sources 20.

Figure 3:
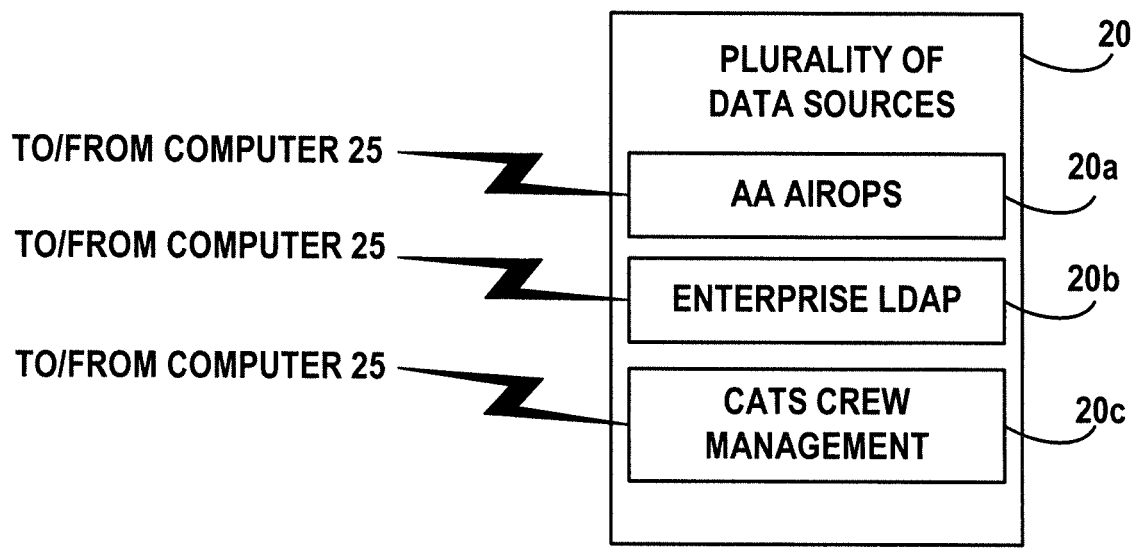
FIG. 3 is a diagrammatic illustration of the plurality of data sources of FIG. 1, according to an exemplary embodiment.

In an exemplary embodiment, as illustrated in FIG. 3 with continuing reference to FIG. 1, the plurality of data sources 20 includes AA AirOps 20a, Enterprise LDAP 20b, CATS Crew Management 20c, and/or one or more computer systems, host-based systems and/or applications thereof. Each of the plurality of data sources 20 may be stored on a computer that is similar or the same as the computer 25.

In an exemplary embodiment, the network 30 includes the Internet, one or more local area networks, one or more wide area networks, one or more cellular networks, one or more wireless networks, one or more voice networks, one or more data networks, one or more communication systems, and/or any combination thereof.

Figure 4:
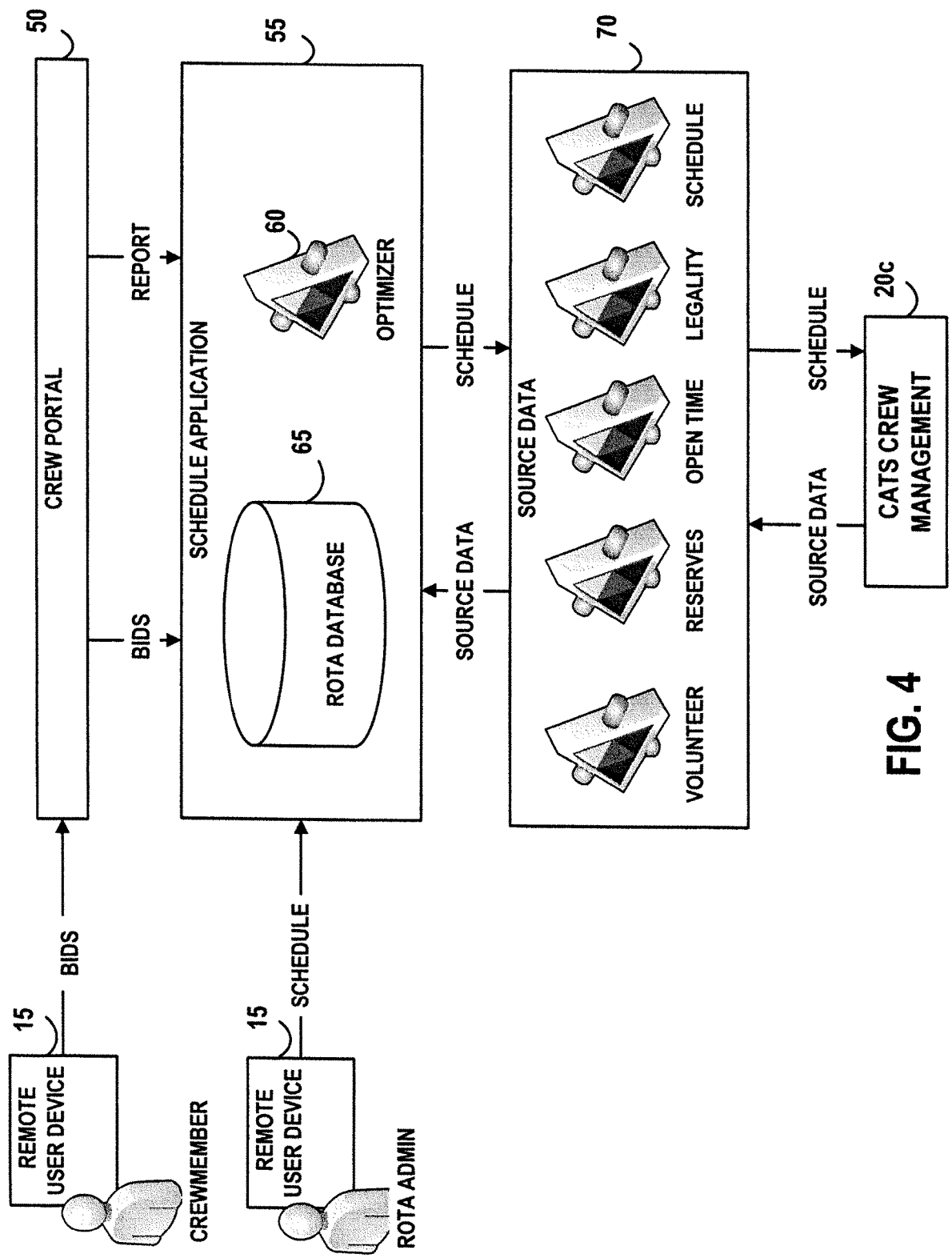
FIG. 4 is a context diagram of the system of FIG. 1, according to an exemplary embodiment, the system having a schedule application and a plurality of logical blocks.
Figure 5:
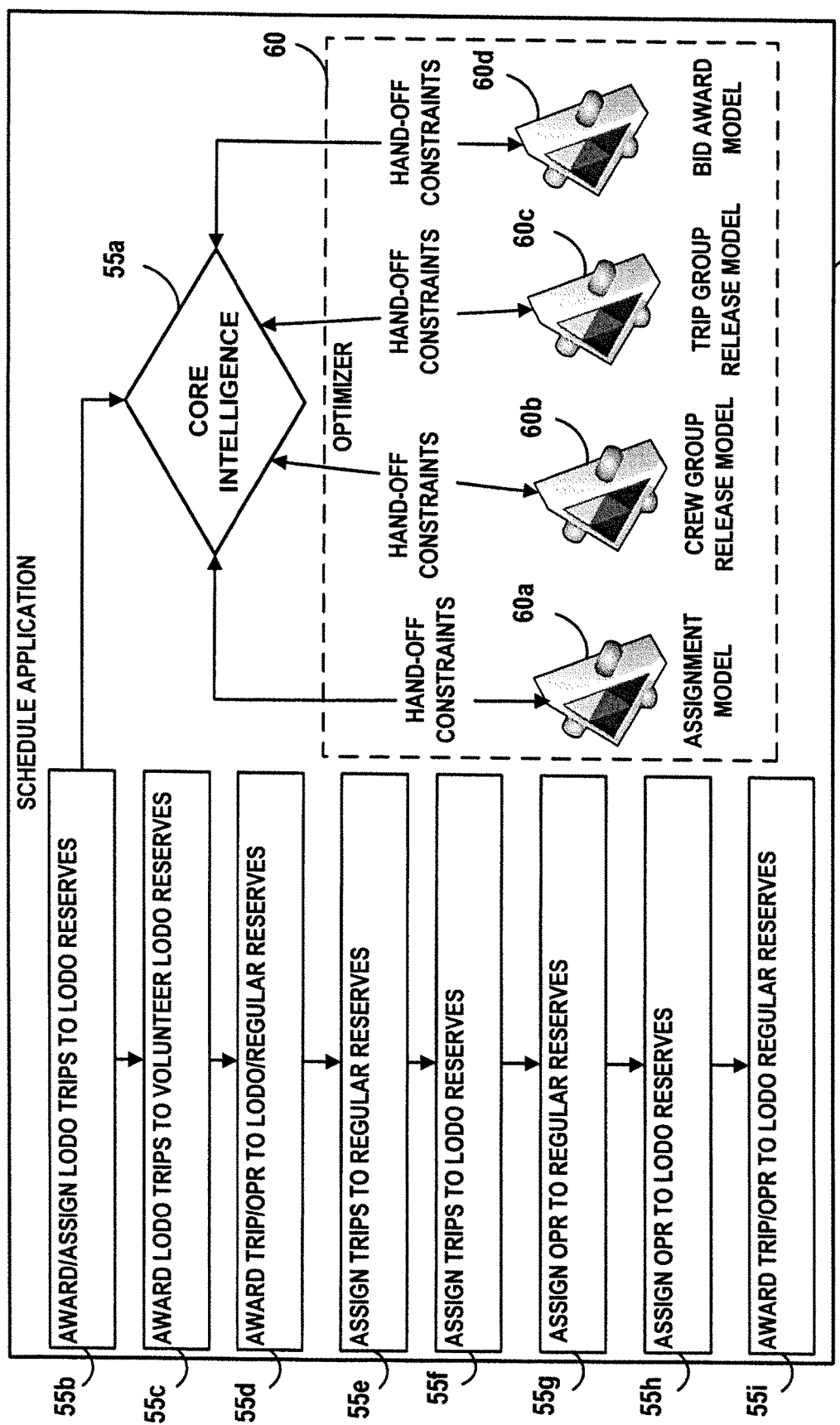
FIG. 5 is a context diagram of the schedule application of FIG. 4, according to an exemplary embodiment.

In an exemplary embodiment, and as shown in FIGS. 4 and 5, a crew portal web site, such as a crew portal 50 may be accessed and displayed on the remote user device 15. The crew portal 50 interacts with a schedule application 55 stored in the computer 25. The schedule application 55 includes an optimizer 60 and a ROTA database 65. Core intelligence logic 55a is stored in the schedule application 55. The schedule application 55 communicates with source data 70, for example data stored in the one or more data sources 20. In an exemplary embodiment, the source data includes data relating to the volunteers that submitted bids to the system 10, the reserves, open time that needs to be covered, the legality rules, and the schedule. An administrator can interact with the schedule application 55 via another remote user device 15 or the computer 25.

In an exemplary embodiment, the schedule application 55 gathers data and interacts with the optimizer 60. The schedule application 55 includes a collection of logical blocks, such as a logical block of "Award/Assign LODO Trips to LODO Reserves" 55b; "Award LODO Trips to Volunteer LODO Reserves" 55c; "Award Trip/OPR to LODO/Regular Reserves" 55d; "Assign Trips to Regular Reserves" 55e; "Assign Trips to LODO Reserves" 55f; "Assign OPR to Regular Reserves" 55g; "Assign OPR to LODO Reserves" 55h; and "Award Trip/OPR to LODO/Regular Reserves" 55i. These logical blocks 55b-55i are arranged in a hierarchy, with each logical block designed to schedule a subset of crewmembers and trips or standby times (i.e., OPR). The ordering of the logical blocks in a hierarchical order, along with the handoff of constraints from a logical blocks higher in the hierarchical order to a logical block lower in the hierarchical order, is designed to produce an overall periodization amongst the entire group of reserve and volunteer crewmembers.

In an exemplary embodiment as shown in FIG. 5, the optimizer 60 includes optimization logic models for solving problems composed of the following three main components: 1) objective function, which is generally to optimize results of the decisions variables; 2) decisions variables, which are a set of values used by the objective function; and 3) constraints, which limits the values considered to be decision variables. The optimizer 60 interacts with the models, which include an Assignment Model 60a, a Crew Group Release Model 60b, a Trip Group Release Model 60c, and a Bid Award Model 60d. These models 60a-60d work together in a controlled and coordinated way to produce correct scheduling results. To assure integrity between the models, results from one of the models 60a-60d are handed-off as constraints to the next of the models 60a-60d.

In an exemplary embodiment, the Assignment Model 60a is used to determine an initial, best overall system solution that maximizes trip coverage and minimizes forced moveable days used. An initial assignment model solution is generated at the beginning of the award process, and is not influenced by crewmember bid preferences or shift bids. An individual crewmember's schedule is assigned using an assignment model solution when a bid for that individual crewmember has not been submitted to the system 10, or when all submitted bids fail to be awarded. The assignment model solution is not static and the award of crewmember bids create circumstances when it must be regenerated.

Generally, a crewmember has "availability" based on, or equivalent to, the number of days remaining in their reserve duty. In some embodiments, the system 10 groups the crewmembers into groups based on the crewmembers' availability in days. Thus, a crewmember having three days of availability will be grouped in a "3 day availability group."

In an exemplary embodiment, the Crew Group Release Model 60b is used to determine, for a shift bid requesting a trip that has fewer days than the crewmember's availability, that awarding the bid does not increase the number of unassigned trips within that crewmember's group. A crewmember is generally restricted from being awarded/assigned a trip that has fewer days than the crewmember's availability unless there is a sufficient number of crewmembers within the crewmember's group that can cover remaining trips. That is, only when there are more crewmembers than trips within the crewmember's group may the crewmember be awarded a trip that has fewer days than the crewmember's availability.

In an exemplary embodiment, the Trip Group Release Model 60c is used to determine, for a bid requesting a trip that has more days than the crewmember's availability, that awarding the bid does not increase the number of unassigned crewmembers in a group that is associated with the requested trip's number of days. That is, if the crewmember requesting a 3 day bid has 2 days of availability, the system 10 will determine whether awarding the 3 day bid will result in another crewmember, which has 3 days of availability, not being assigned a 3 day bid because there are too few 3 day assignments remaining. A crewmember is generally restricted from being awarded/assigned a trip with greater days than the crewmember's availability unless there is an insufficient number of crewmembers in the days-of-availability group that is associated with the requested trip's number of days.

In an exemplary embodiment, the Bid Award Model 60d is used to determine if a trip, requested via a bid preference, will be awarded. The model will award a legal trip unless: 1) the maximum number of trips covered, compared to the initial assignment model solution, is reduced, 2) the minimum number of forced day-off, compared to the initial assignment model solution, is increased, 3) the Crew Group Release Model 60b is not violated and 4) the Trip Group Release Model 60c is not violated.

Figure 6:
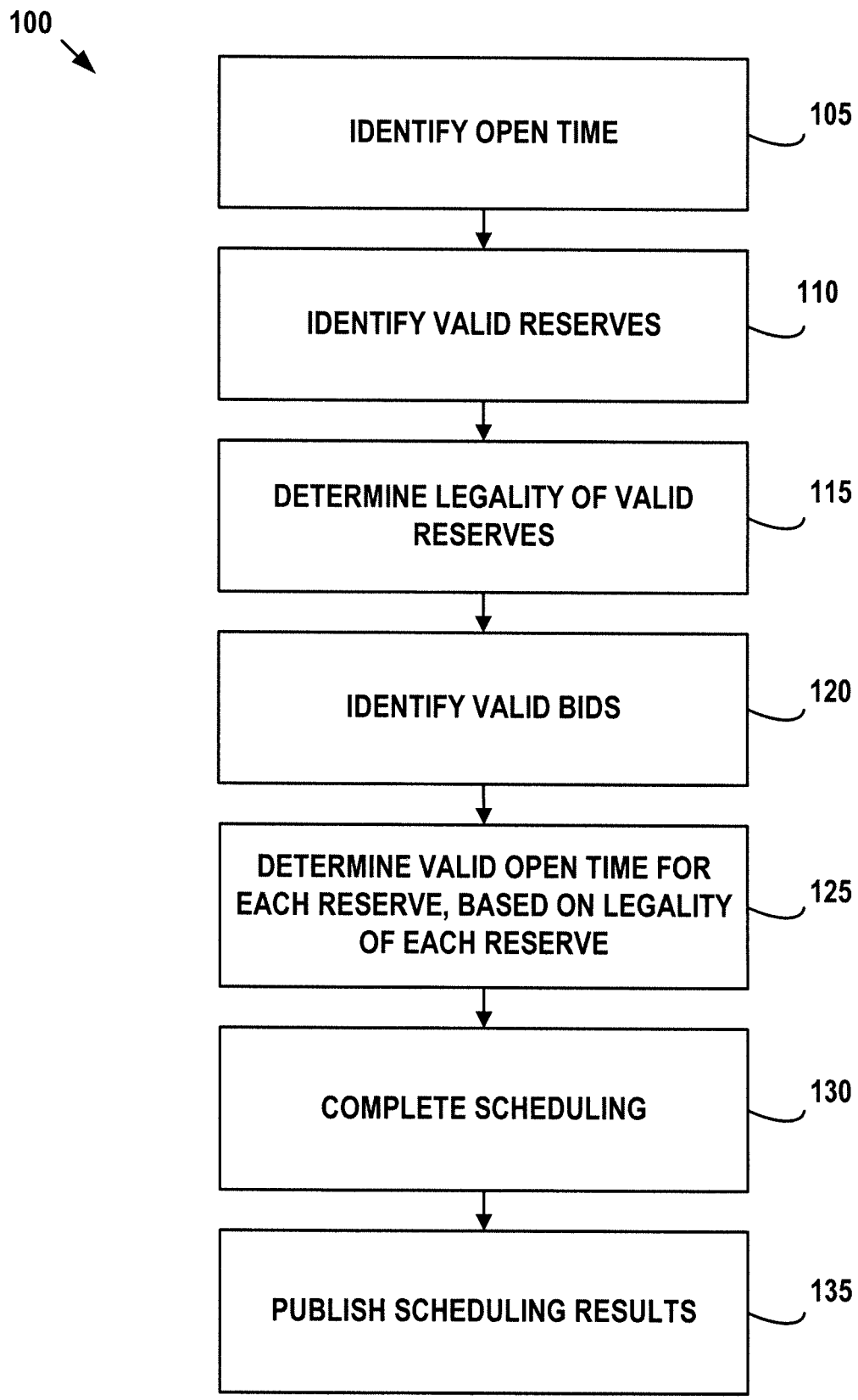
FIG. 6 is a flow chart illustration of a method of operating the system of FIG. 1, according to an exemplary embodiment.

In an exemplary embodiment, as illustrated in FIG. 6 with continuing reference to FIGS. 1-5, a method of generating a transparent optimized shift schedule for a plurality of crewmembers, by operating the system 10, is generally referred to by the reference numeral 100. The method 100 includes identifying open time for a predetermined time period at step 105; identifying valid reserves at step 110; determining the legality of the valid reserves at step 115; identifying valid bids at step 120; determining valid open time for each reserve based on the legality of each reserve at step 125; completing scheduling at step 130; and publishing scheduling results at step 135.

In an exemplary embodiment, the system 10 identifies open time at the step 105. Open time includes a time requiring a crewmember to be assigned. In some embodiments, open time includes pairings or trips (i.e., a series of flight segments that fall between check-in and check-out at a flight attendant's domicile) and On Premise Reserve ("OPR") shifts (i.e., standby shifts that require a crewmember to report to the airport without a specific flight assignment for the purpose of covering a pairing in order to prevent a delay). In some embodiments, LODO trips are trips or shifts that are associated with a language requirement such that a crewmember must satisfy a language requirement to be assigned the trip or OPR shift. ROTA Admin can manually start ROTA, or the system 10, via a ROTA Admin web site, by choosing a date and a crew base to schedule. Thus, the predetermined time period can be specific to one crew base and cover a specific time period, such as a 1 day period, a 3 day period, a week period, or a month period, or any length of period. Generally, the open time is identified by sending a request to Crew Management System 20c for all open time for the base/date to be scheduled.

In an exemplary embodiment, the system 10 identifies valid reserves at the step 110. Valid reserves include LODO reserves; general reserves; general volunteers; and LODO volunteers. Generally, the valid reserves are identified by sending a request to Crew Management System 20c for all reserves on duty for the base/date to be scheduled.

In an exemplary embodiment, the system 10 determines the "legality" for each of the valid reserves at the step 115. Legality is a set of rules that must be met before scheduling a crewmember. For example, the legality may include rules relating to seniority and equity requirements, scheduled days free of duty, assigning flight duty on a "Moveable Day", uninterrupted domicile rest, on premise reserve ("OPR"), reserve availability period ("RAP"), etc. For example, the system 10 may determine each crewmember's availability, in days, during the step 115. In an exemplary embodiment, the system 10 groups the valid reserves into availability groups according to the number of days of each crewmember's availability. In one embodiment, determining the legality of the valid reserves includes ranking the valid reserves based on seniority, with the more senior reserves being ranked above less-senior reserves.

In an exemplary embodiment, the system 10 identifies valid or eligible bids at the step 120. The system 10 receives bids that have been submitted by LODO reserves, general reserves, LODO volunteers, and general volunteers. Generally, a bid indicates a crewmember's preference for a trip or to remain on call (ROC). Trips can be bid by either specific ID or generic characteristics. Examples of bids include preferred specific pairings, pairing preferences consistent with those available for specific OPR shifts and specific RAPs. Bids may also include a preference requesting: that the crewmember remain on call, a trip with fewer days than crewmember availability; a trip with more days than crewmember availability; a trip with equal days than crewmember availability; a trip designated as an international premium trip (IT, pure TI, 1 day>8 hours); an OPR with fewer days than crewmember availability; an OPR with more days than crewmember availability; an OPR with equal days than crewmember availability; a trip (non-LODO) by a LODO crewmember. In an exemplary embodiment, the system 10 evaluates the received bids to determine if the received bids are valid bids that could be awarded without violating the legality of the reserve that submitted the bid.

In an exemplary embodiment, the system 10 determines valid open time for each reserve, based on the legality of each reserve at the step 125. This allows the system 10 to identify the open shifts which could be awarded to each reserve (including volunteers) without violating the legality of each reserve.

Figure 7A:
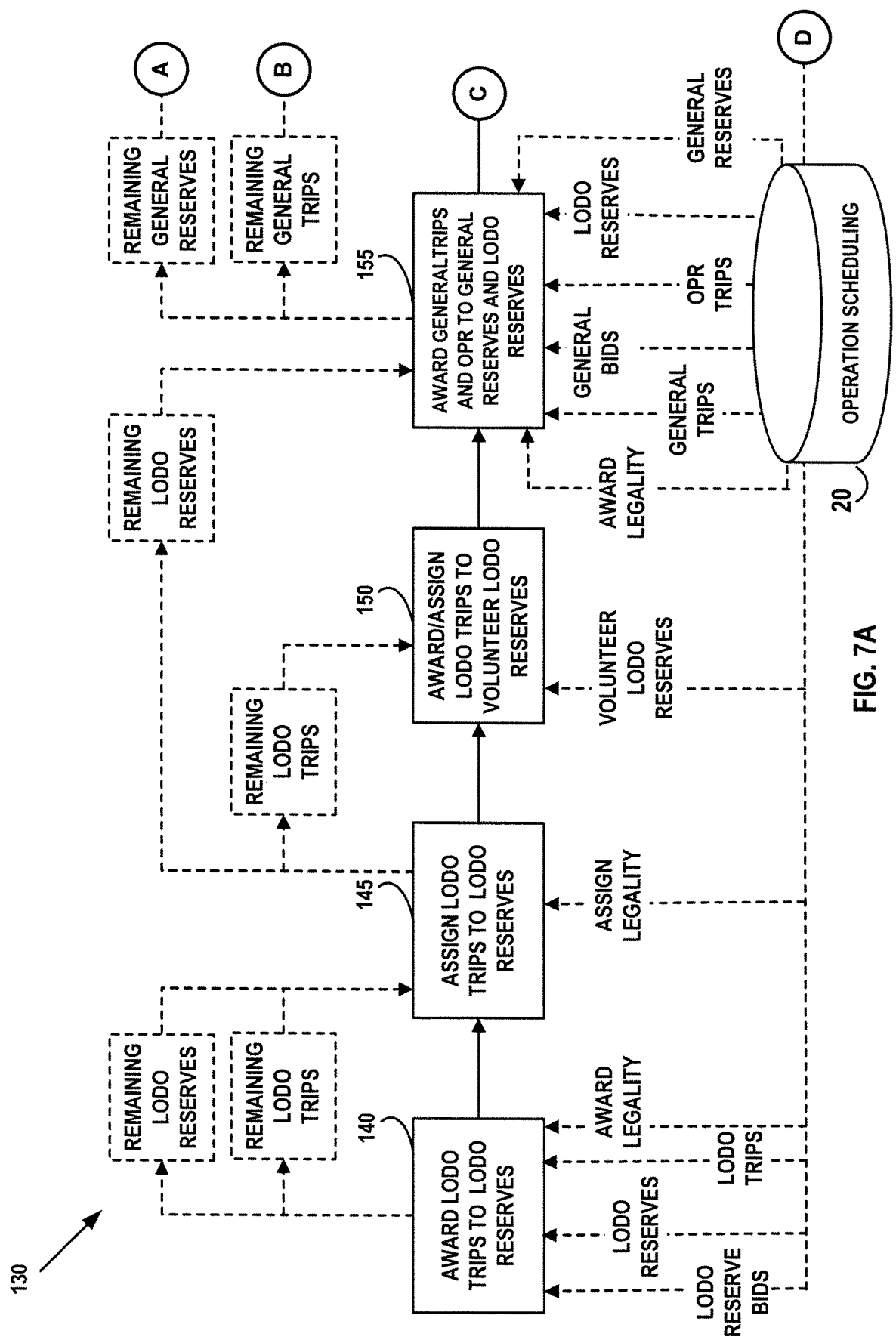
FIGS. 7A and 7B together form a flow chart illustration of a step of the method of FIG. 6, according to an exemplary embodiment.
Figure 7B:
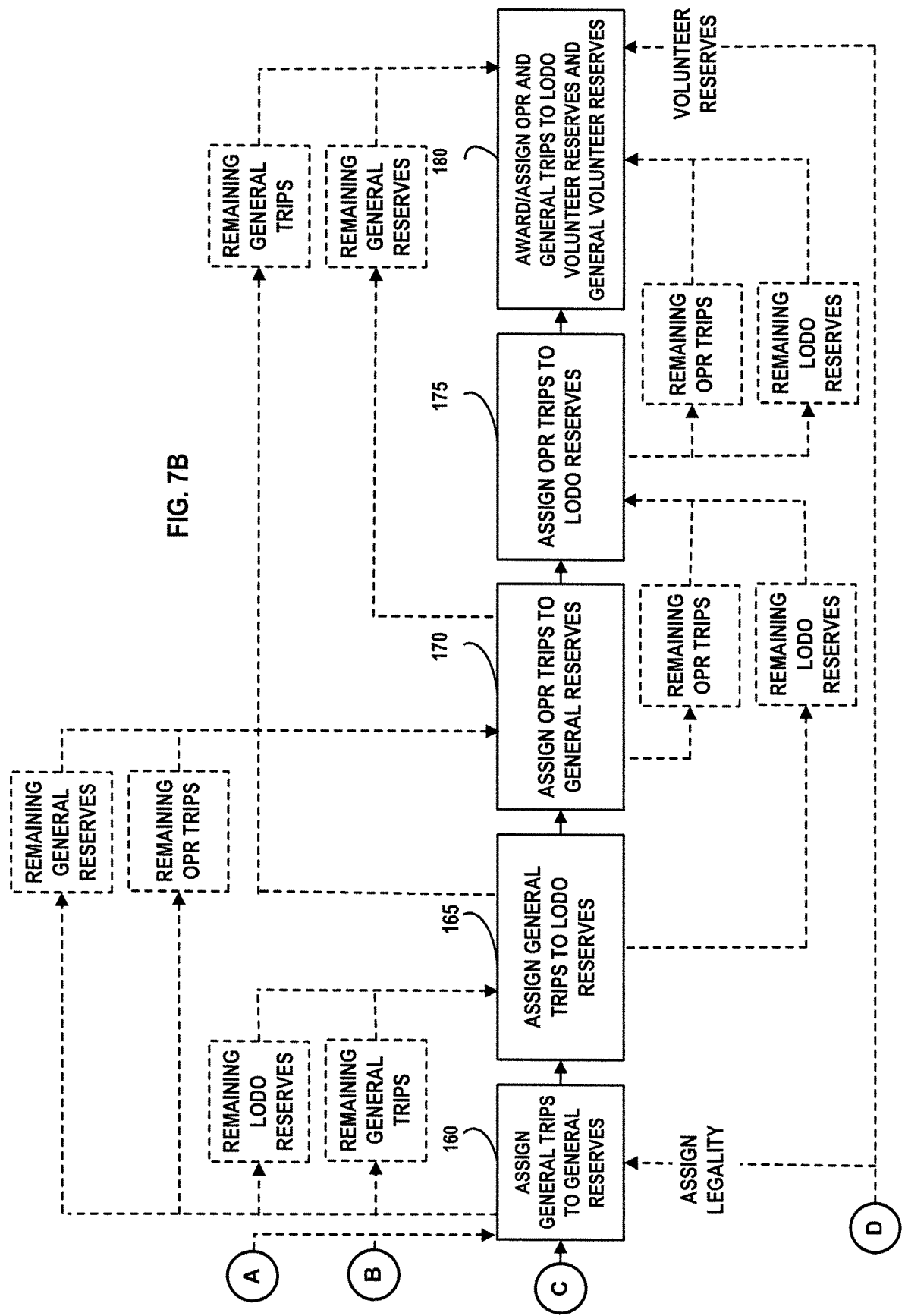

In an exemplary embodiment, the system 10 completes scheduling at the step 130. In an exemplary embodiment, as illustrated in FIGS. 7A and 7B with continuing reference to FIGS. 1-6, the step of completing scheduling includes multiple steps such as awarding LODO trips to LODO reserves at step 140; assigning LODO trips to LODO reserves at step 145; awarding/assigning LODO trips to LODO volunteer reserves at step 150; assigning general trips and OPR to general reserves and LODO reserves at step 155; assigning general trips to general reserves at step 160; assigning general trips to LODO reserves at step 165; assigning OPR trips to general reserves at step 170; assigning OPR trips to LODO reserves at step 175; and awarding/assigning OPR and general trips to LODO volunteer reserves and general volunteer reserves at step 180. In an exemplary embodiment, and generally, the system 10 applies business rules to a list that includes each crewmember, ranked according to seniority order, and the schedule is dependent upon the aggregate of all scheduling resulting in maximum trip coverage and the aggregate of all scheduling must result in minimum forced day-offs used.

Figure 8:
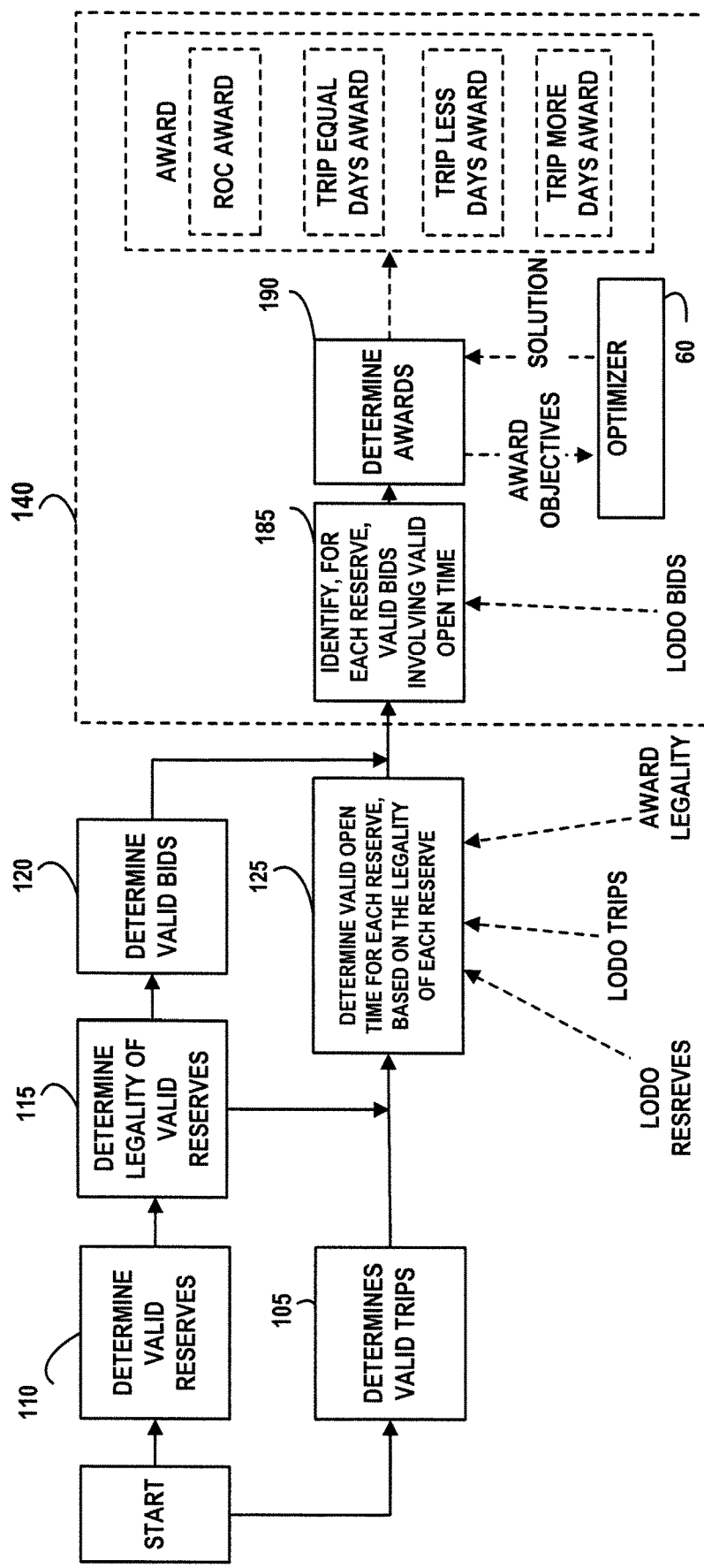
FIG. 8 is a flow chart illustration of a method of operating the system of FIG. 1, according to an exemplary embodiment.
Figure 9A:
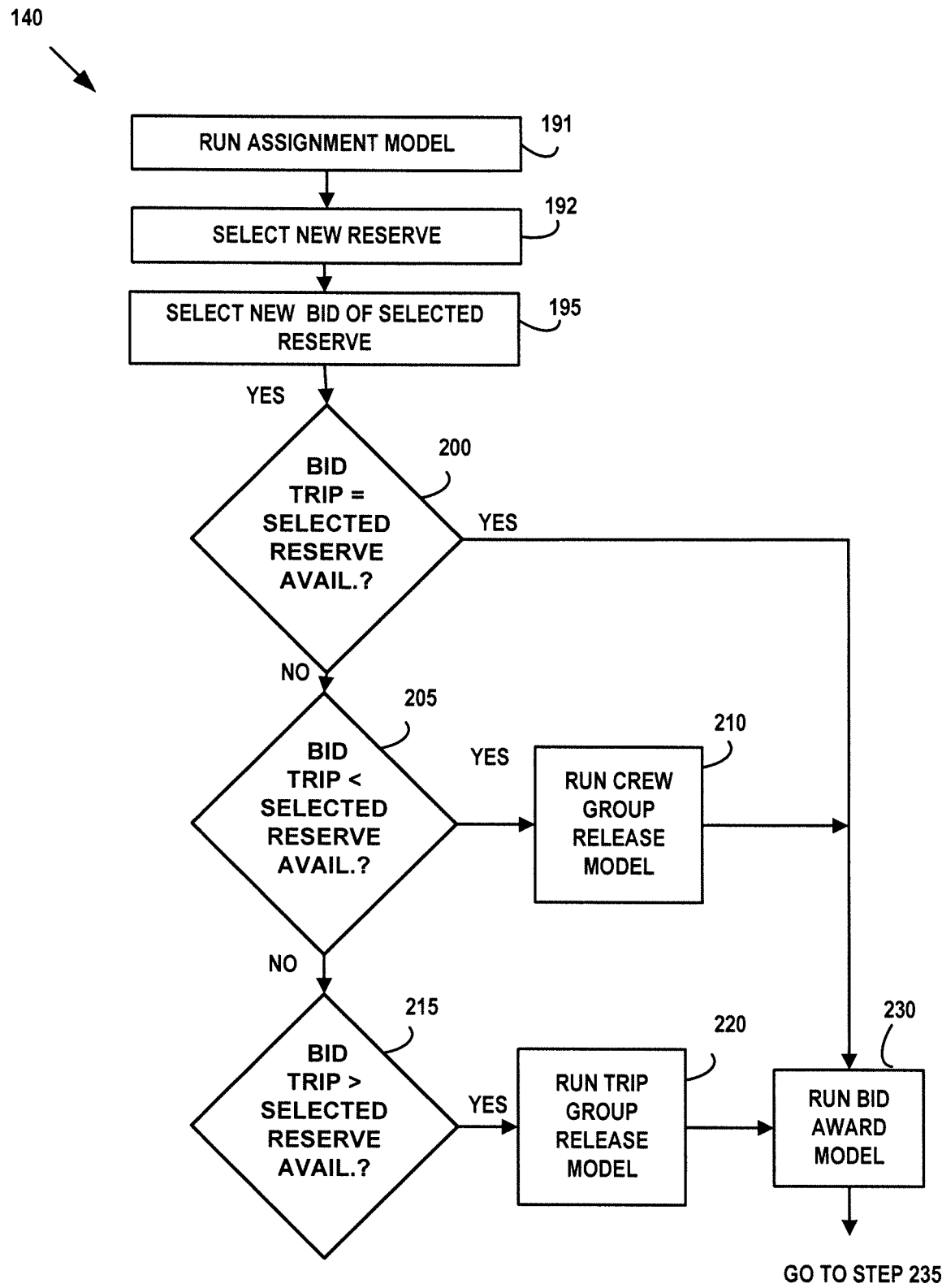
FIGS. 9A and 9B together form a flow chart illustration of a step of the method of FIGS. 7A and 7B, according to an exemplary embodiment.
Figure 9B:
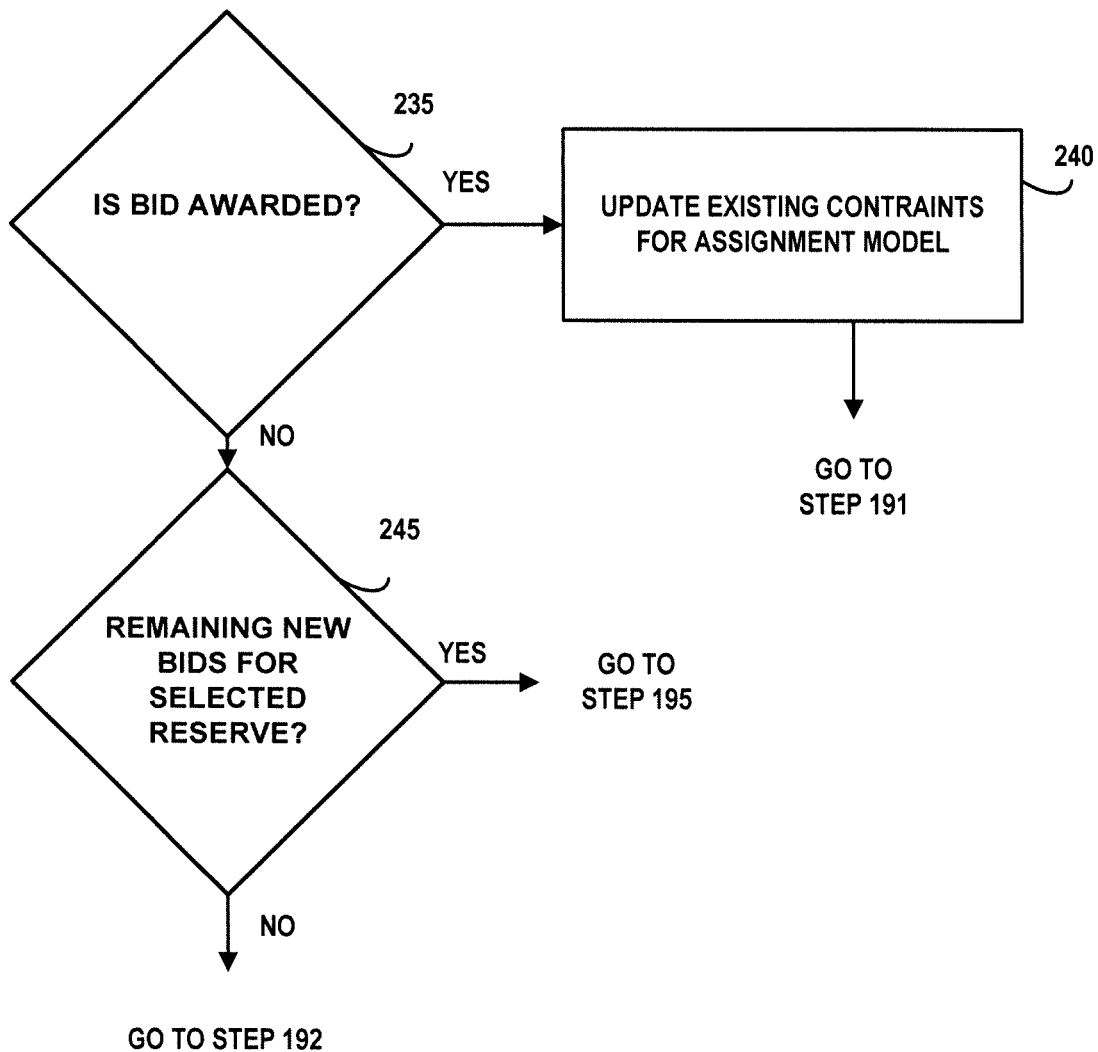

In an exemplary embodiment, the system 10 awards LODO trips to LODO reserves at the step 140. FIG. 8 is a flow chart illustration that includes the steps 105, 110, 115, 120, 125, and 140, with the step 140 including sub steps of identifying, for each reserve, valid bids involving valid open time at step 185 and determining awards at step 190. In an exemplary embodiment, the step 185 includes identifying, for each crewmember, valid shift bids that involve valid, open time identified during the step 125. Determining awards at the step 190 involves using the Assignment Model 60a, the Crew Group Release Model 60b, the Trip Group Release Model 60c, and the Bid Award Model 60d of the optimizer 60. In an exemplary embodiment, as illustrated in FIGS. 9A and 9B with continuing reference to FIGS. 1-6, 7A-7B, and 8, when awarding trips, the system 10 first runs the Assignment Model 60a to determine a best overall system solution (involving all valid reserves, etc.), selects a new reserve at step 192, selects a new bid of the selected crew member at step 195, determines if the selected bid has a trip length that has the same number of days as the crew member's availability at step 200. If the answer to the step 200 is no, then it is determined if the selected bid has a trip length that has fewer days than the crew member's availability at step 205. If the answer to the step 205 is yes, then the system 10 runs the Crew Group Release Model 60b at step 210. If the answer to the step 205 is no, then it is determined if the selected bid trip has a trip length that is greater than the crew member's availability at step 215. If the answer to the step 215 is yes, then the system 10 runs the Trip Group Release Model 60c at step 220. After the steps 210 and 220 and when the answer to the step 200 is yes, then the next step running the Bid Award Model 60d at step 230. Generally, when the Bid Award Model 60d is run, the selected bid is awarded if the trip coverage is not decreased from the coverage of the solution from the previously run Assignment Model 60a and the forced Day-Off is not increased from a forced Day-Off of the solution from the previously run Assignment Model 60a. After the step 230, it is determined whether the bid is awarded to the crew member at step 235. If so, the next step is updating existing constraints for the Assignment Model 60a at step 240 and then returning to the step 191. Generally, and due to awarded bids not increasing the number of uncovered trips associated with the solution of the first run of the assignment model and not increasing a number of required moveable days associated with the solution of the first run of the assignment model, the number of uncovered trips and the number of required moveable days associated with the new, or second solution based on the Assignment Model 60a do not change. If the bid was not awarded to the crew member at the step 235, then the next step is determining whether there are any remaining new bids for the selected crewmember at step 245. If there are remaining new bids for the selected crewmember, then the next step is the step 195. If there are no remaining new bids for the selected crew member, then the next step is the step 192.

In an exemplary embodiment and during the step 191, the Assignment Model 60a is run. In several exemplary embodiments, the Assignment Model 60a includes solving mathematical problems successively using different objective functions. That is, the Assignment Model 60a includes a plurality of mixed integer program assignment models that are arranged in a hierarchical order. The first run of the Assignment Model 60a includes the base assignment model for maximizing trip coverage, along with the objective of minimizing uncovered trips having lengths of 1, 2, 3, and 4 days (i.e., Objective: max total coverage or $\Sigma_j COV_j$) and can be mathematically written as follows:

Minimize:

$$\Sigma_j COV_j \quad (1)$$

Subject to:

$$\Sigma_i a_{ik} CrewTrip_{ik} + UNC_k = 1 \text{ for all trips } k \quad (2)$$

$$\Sigma_k a_{ik} CrewTrip_{ik} + CrewROC_i = 1 \text{ for all crew } I \quad (3)$$

$$\Sigma_k b_{kj} UNC_k = COV_j \text{ for } j=1,2,3,4 \quad (4)$$

Where:
k index of open trips
i index of reserve crew
j index of number days on an open trip
m index of number of moveable days a reserve will have to work on when assigned a trip
$a_{ik}$ parameter that maps legality. It is 1 if a reserve crew i can be assigned open trip k
$b_{kj}$ parameter that indicates trip k spans over j days
$d_{ik}^m$ parameter that indicates if crew I is assigned to trip j, it will be forced to work m moveable days
$UNC_k$ decision variable 1 if a trip k is uncovered
$COV_k$ total trips that with length of j day that is not covered by any Reserves (j=1 . . . 4)
$MOV_m$ total number of reserves that were forced to work on exactly m of his moveable day(s)
$CrewTrip_{ik}$ is 1 if Reserve Crew i is assigned for Trip k. Assuming there are $n_i$ Crew and $n_k$ Trips. Only valid combination will be generated (based on web service calls from CATS—legal checker)
$CrewROC_i$ is 1 if Reserve Crew i is assigned ROC assignment (Remain On Call—no bid is awarded)

In several embodiments, the mixed-integer program parameters, as described above, are used consistently throughout the system 10.

In several exemplary embodiments, the objection of function (1) is to minimize uncovered trips (i.e., trips that do not have a crew assigned) of 1, 2, 3 and 4 days. In several exemplary embodiments, function (2) indicates that each trip k must either be marked as uncovered ($UNC_k=1$) or being assigned a crew bid. In several exemplary embodiments, function (3) indicates that each reserve crew I must either be assigned to work on a trip k or be assigned as ROC (Remain on call). In several exemplary embodiments, function (4) is an accounting constraint that will aggregate uncovered trips into its correct category (1, 2, 3 or 4 day length) into one metric of total uncovered trip of a day. Each successive run of the Assignment Model 60*a* during the step 191 has a different objective function and includes the hand-off constraints handed down from the previous runs of the Assignment Model 60*a* during the step 191.

The second run of the Assignment Model 60*a* during the step 191 includes a different objective function and includes hand-off constraints handed down from the first run of the Assignment Model 60*a*. The second run of the Assignment Model 60*a* has an objective of: 3-day move, or $MOV_3$. Thus, the function (1) is replaced with $MOV_3$, to minimize the number of total reserves that would be forced to work on three of their moveable days. The constraints used during the second run include a hand-off constraint that is from the previous run of the Assignment Model 60*a* that can be mathematically written as follows:

$$\Sigma_j COV_j <= Sol^1 \text{ from previous first phase of assignment} \quad (5)$$

and additional definition constraints that can be mathematically written as follows:

$$\Sigma_{i,k} d_{ik}^3 \text{CrewTrip}_{ik} = MOV_3 \quad (6)$$

The function (5) ensures that the minimum number of uncovered trips associated with the solution of the first run of the assignment model is not increased.

The third run of the Assignment Model 60*a* during the step 191 has an objective of: 2-day move, or $MOV_2$. Thus, the function (1) is replaced with $MOV_2$, to minimize the number of total reserves that would be forced to work on two of their moveable days. The constraints used during the third run include the functions (5) and (6), along with additional definition constraints that can be mathematically written as follows:

$$\Sigma_{i,k} d_{ik}^2 \text{CrewTrip}_{ik} = MOV_2 \quad (7)$$

The fourth run of the Assignment Model 60*a* during the step 191 has an objective of: 1-day move, or $MOV_1$. Thus, the function (1) is replaced with $MOV_1$, to minimize the number of total reserves that would be forced to work on one of their moveable days. The constraints used during the fourth run include the functions (5), (6), and (7) along with additional definition constraints that can be mathematically written as follows:

$$\Sigma_{i,k} d_{ik}^1 \text{CrewTrip}_{ik} = MOV_1 \quad (8)$$

The fifth run of the Assignment Model 60*a* during the step 191 has an objective of: max 4-day open trip coverage, or $COV_4$. Thus, the function (1) is replaced with $COV_4$, to minimize the number of number of uncovered trips that have a length of 4 days. The constraints used during the fifth run include the functions (5), (6), (7), and (8) along with additional definition constraints that can be mathematically written as follows:

$$\Sigma_{i,k} d_{ik}^4 \text{CrewTrip}_{ik} = COV_4 \quad (9)$$

The sixth run of the Assignment Model 60*a* during the step 191 has an objective of: max 3-day open trip coverage, or $COV_3$. Thus, the function (1) is replaced with $COV_3$, to minimize the number of number of uncovered trips that have a length of 3 days. The constraints used during the sixth run include the functions (5), (6), (7), (8), and (9) along with additional definition constraints that can be mathematically written as follows:

$$\Sigma_{i,k} d_{ik}^3 \text{CrewTrip}_{ik} = COV_3 \quad (10)$$

The seventh run of the Assignment Model 60*a* during the step 191 has an objective of: max 2-day open trip coverage, or $COV_2$. Thus, the function (1) is replaced with $COV_2$, to minimize the number of number of uncovered trips that have a length of 2 days. The constraints used during the seventh run include the functions (5), (6), (7), (8), (9), and (10) along with additional definition constraints that can be mathematically written as follows:

$$\Sigma_{i,k} d_{ik}^2 \text{CrewTrip}_{ik} = COV_2 \quad (11)$$

The eighth run of the Assignment Model 60*a* during the step 191 has an objective of: max 1-day open trip coverage, or $COV_1$. Thus, the function (1) is replaced with $COV_1$, to minimize the number of number of uncovered trips that have a length of 1 day. The constraints used during the eighth run include the functions (5), (6), (7), (8), (9), (10) and (11) along with additional definition constraints that can be mathematically written as follows:

$$d_{ik}^1 \text{CrewTrip}_{ik} = COV_1 \quad (12)$$

The ninth run of the Assignment Model 60*a* during the step 191 has an objective of: minimize extra move-down, The constraints used during the ninth run include the functions (5), (6), (7), (8), (9), (10), (11), and (12) along with an additional constraint relating to the minimization of extra move-down.

The tenth run of the Assignment Model 60*a* during the step 191 has an objective of: assigning ROC awards. The constraints used during the tenth run include all of the previous constraints. During the tenth run, the Assignment Model 60*a* loops over each $Crew_i$ and tries to award them as ROC, or Remain on Call, by creating a new objective specific for $Crew_i$:

$$Z_{Forced\_i} = \text{Min } \Sigma V_{ik} Crew_i T_k \text{ for all trips } k \quad (13)$$

Where:
$V_{ik}$ is the bid value for trip k when awarded to $Crew_i$; with $V_{ik}$ for ROC is given a value of 10 (priority) and $V_{ik}$ for other legal trip is given a value of 100.

The system 10 sets a hand-off constraint award for Crew; as listed below in function (14) and then moves on to another crewmember.

$$Crew_i T_k^* = 1 \quad (14)$$

An initial solution is generated during the ten runs, or iterations, of the Assignment Model 60*a* during the step 191. The initial solution does not take into account any bids received from crewmembers, but is merely an optimal solution based on the open time, reserves, and legality.

In an exemplary embodiment and after the Assignment Model generates an initial solution at the step 191, a new reserve is selected at the step 192. In an exemplary embodiment, the bids of the reserves are considered by the system 10 based on each crewmember's seniority. Thus, the most senior LODO reserve will be the first new reserve selected and the system 10, with less senior reserves being selected thereafter.

In an exemplary embodiment and at the step 195, a bid associated with the reserve is selected.

In an exemplary embodiment and at the step 200, the system 10 determines whether a trip associated with the bid has the same number of days as the crew member's availability. If so, the next step is 230. If not, then the next step is the step 205.

In an exemplary embodiment and at the step 205, the system 10 determines whether a trip associated with the first bid has fewer number of days than the crew member's availability. If so, the next step is 210. If not, then the next step is the step 215.

In an exemplary embodiment and at the step 210, the Crew Group Release Model 60*b* is run. The Crew Group Release Model 60*b* is used to determine, for the bid requesting a trip with fewer days than crewmember's availability, that the award of the bid would not increase, compared to the Assignment Model solution, the number of unassigned trips within the crewmember's group. The Crew Group Release Model 60*b* has an object function that allows for a bid for a trip with fewer days than crewmember's availability when:

$$Z_{GroupRelease} = V_{i,ROC}F_iT(ROC) + M\Sigma V_{ik}F_iT_k \text{ for all trips } k \text{ or other non-ROC trips} \quad (15)$$

Four model objects are generally required. A model is built for each of the four allowed trip durations: 1-day, 2-day, 3-day and 4-day. The model is only executed when a bid is requesting a trip with fewer days than the crewmember's availability. Only the model corresponding to the same number of days as the crewmember's availability is executed. For example, if crewmember is available for 3 days, the problem would be solved for set $I_3$ and $K_3$. The Crew Group Release Model 60*b* uses the hand-off constraints, or constraint functions, relating to the coverage of group-day trips from the Assignment Model 60*a*.

In an exemplary embodiment and at the step 215, the system 10 determines whether the trip associated with the bid has a greater number of days than the crew member's availability. If so, the next step is 220.

In an exemplary embodiment and at the step 220, the Trip Group Release Model 60*c* is run. The Trip Group Release Model 60*c* is used to determine, for the bid requesting the trip with more days than crewmember's availability, that the award of the bid would not increase the number of unassigned crewmembers in the availability group equal to the trip's number of days. The model is similar to the Crew Group Release Model 60*b* except that the objective function allows a bid for trip with more days than crewmember's availability when:

$$Z_{GroupRelease} = V_{i,ROC}F_iT(ROC) + M\Sigma V_{ik}F_iT_k \text{ for all trips } k \text{ or other non-ROC trips} \quad (16)$$

In an exemplary embodiment and at the step 230, the Bid Award Model 60*d* is run. The Bid Award Model 60*d* uses the results, or initial solution, from the step 191. Generally, if the trip coverage is not decreased and a forced day-off used is not increased, then the bid is awarded. In some embodiments, the Bid Award Model 60*d* provides or documents a reason why a bid is being rejected. In particular and in some embodiments, the Bid Award Model 60*d* determines and documents, for each un-awarded bid, whether the rejected bid resulted in: reducing the maximum number of trips covered; increasing the minimum number of forced day-off used; increases the number of unassigned trips within the reserve's availability group (based on days of remaining availability and as calculated in the Crew Group Release Model 60*b*); or increases the number of unassigned crewmembers in the availability group that is equal to the trip's number of days (as calculated in the Trip Group Release Model 60*c*). The model has the following features: 1) the objective is to minimize incremental shortage increase and incremental moveable day increase; 2) hand-off constraints are the constraints from the Assignment Model 60*a*; 3) new incremental shortage and moveable day increase are introduced into the model; and 4) hand off constraints also include a bid accepted from previously more senior crew-member.

In an exemplary embodiment and at the step 235, the system 10 determines if the bid was awarded. If yes, then the next step is the step 240. If no, then the next step is the step 245.

In an exemplary embodiment and at the step 240, the system 10 updates the existing constraints for the Assignment Model 60*a*. The next step is the step 191.

In an exemplary embodiment and at the step 245, it is determined whether there are remaining new bids for the selected reserve. If yes, then the next step is the step 195. If no, then the next step is the step 192. In some embodiments and if there are no remaining new bids for the selected reserve, an assignment is made, based on the most recent optimum solution generated by the Assignment Model 60*a*, for the selected reserve prior to the step 192.

Thus, the system 10, by executing the steps 191-245, awards or rejects the LODO bids.

Returning back to FIGS. 7A and 7B, there may be LODO reserves that were not awarded a LODO bid and/or there may be remaining LODO trips that have not been assigned a crewmember.

Figure 10:
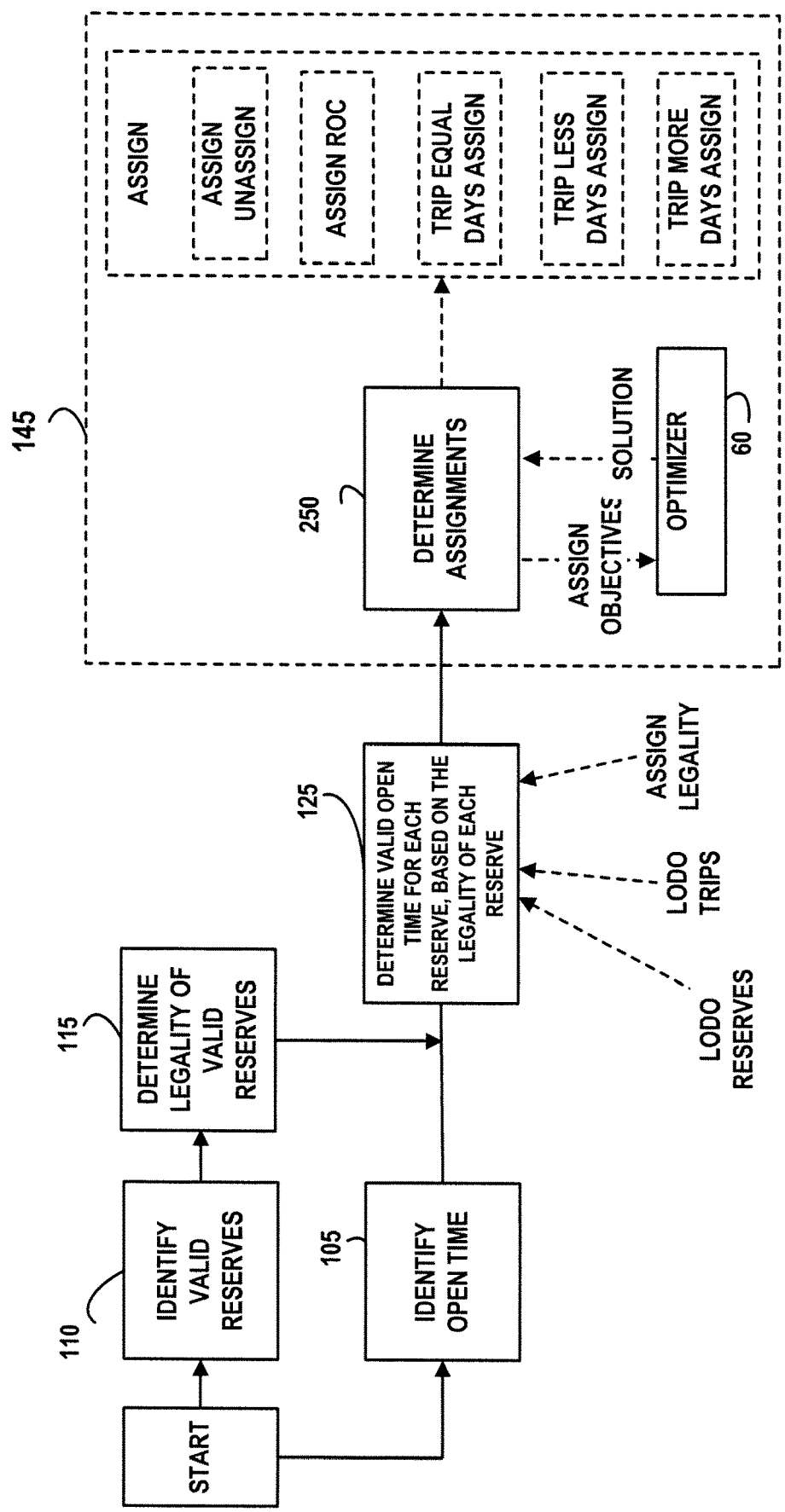
FIG. 10 is a flow chart illustration of a method of operating the system of FIG. 1, according to an exemplary embodiment.

At the step 145 and after the step 140, the system 10 assigns LODO trips to LODO reserves. The remaining LODO trips (from the step 140) are assigned to the remaining LODO reserves (from the step 140) based on the most recent optimum solution of the Assignment Model 60*a*. FIG. 10 is a flow chart illustration that including the steps 105, 110, 115, 120, 125, and 145, with the step 145 including the step of determining assignments at step 250. At the step 250, the Assignment Model 60*a* is run, using at least the constraints used during the step 140, to assign at least a portion of the remaining LODO trips to at least a portion of the remaining LODO reserves.

Figure 11:
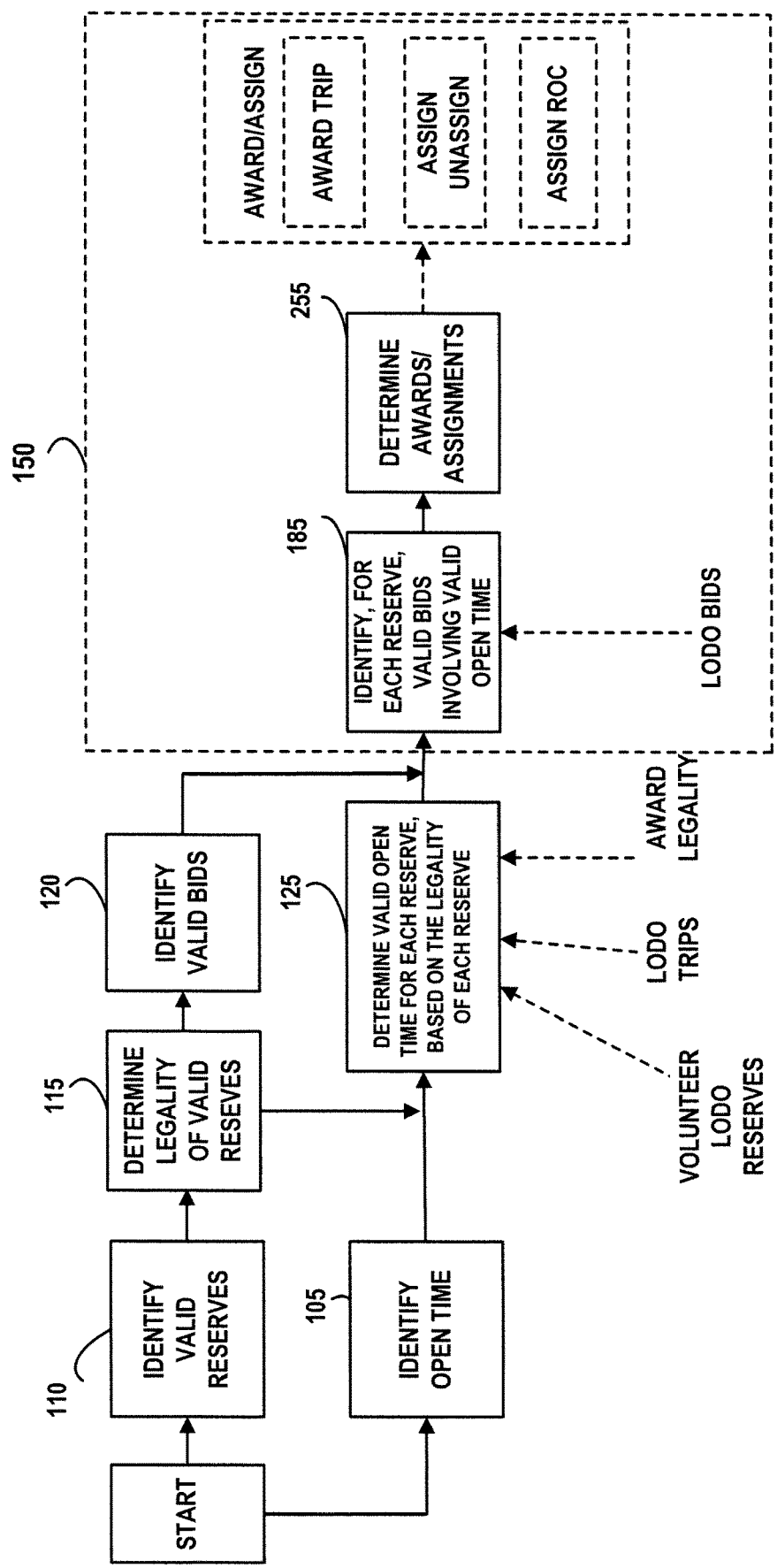
FIG. 11 is a flow chart illustration of a method of operating the system of FIG. 1, according to an exemplary embodiment.

Returning back to FIGS. 7A and 7B, there still may be LODO reserves that were not awarded a LODO bid at the step 140 and/or assigned LODO trip at the step 145 and/or there may be remaining LODO trips that have not been assigned a crewmember at the step 140 or at the step 145. At the step 150, the system awards/assigns remaining LODO trips (from steps 140 and 145) to volunteer LODO reserves. FIG. 11 is a flow chart illustration that including the steps 105, 110, 115, 120, 125, and 145, with the step 150 including the steps 185 and the step of determining awards/assignments at step 250. In an exemplary embodiment, the step 185 includes identifying, for each LODO volunteer reserve, valid shift bids that involve valid, open time identified during the step 125. That is, the system 10 looks to determine whether any of the bids received from the LODO volunteers are a valid and legal option for that LODO volunteer reserve. At the step 255, the system 10 awards/assigns the legal bids of the LODO volunteers in straight seniority order.

Returning yet again to FIGS. 7A and 7B, and at the step 155, the system 10 awards general trips and OPR to LODO reserves that remain after the step 140 and 145 and to general reserves. In an exemplary embodiment, the general reserves will be included in the step 155 regardless if they have provided a bid. In an exemplary embodiment, the LODO reserves that have not yet been scheduled may at their option bid to be included during the step 155. Generally, the system 10 awards bids to the general reserves and the LODO reserves in the step 155 in an identical or similar manner to the manner in which it awards bids to the LODO reserves in the step 140. In general, a general trip has a higher scheduling priority than OPR. In an exemplary embodiment, LODO reserves are only included in the award objective when reached in seniority list. Thus, constraints must be regenerated when a reserve LODO is included. In an exemplary embodiment, the objective used when determining awards is to maximize trip assignments, maximize OPR assignments, and minimize Move up Days.

In an exemplary embodiment and at the step 160, the system 10 assigns general trips that are still uncovered after the step 155 to the general reserves that remain after the step 155. Generally, the system 10 assigns the general trips during the step 160 using the Assignment Model 60a and similarly to the step 145. In an exemplary embodiment, the objectives used when determining assignments at the step 160 are to maximize trip assignments, minimize Move Up Days, and minimize Move Down Days.

In an exemplary embodiment and at the step 165, the system 10 assigns general trips that are still uncovered after the steps 155 and 160 to LODO reserves that remain without an assignment after the step 160. In an exemplary embodiment, the system 10 assigns the general trips during the step 165 in a similar or identical manner in which the system 10 assigns trips during the step 160.

In an exemplary embodiment and at the step 170, the system 10 assigns OPR to general reserves that remain after the step 160. Generally, the system 10 assigns the general trips during the step 160 in a similar to identical manner in which the system 10 assigns trips during the step 160. In an exemplary embodiment, the objectives used when determining assignments during the step 170 include: maximize trip assignments and minimize Move Up Days.

In an exemplary embodiment and at the step 175, the system 10 assigns OPR that remains after the step 170 to LODO reserves that remain after the step 165. Generally, the system 10 assigns the general trips in the step 160 in a similar to identical manner in which the system 10 assigns trips during the step 160. In an exemplary embodiment, the objectives used when determining assignments during the step 175 include: maximize trip assignments; minimize Move Up Days; and minimize Move Down days.

In an exemplary embodiment and at the step 180, the system 10 awards/assigns OPR and general trips that remain after the step 175 to LODO volunteer reserves, general volunteer reserves, and any remaining reserves, such as LODO reserve or general reserve. When determining awards during the step 175, the system 10 awards the legal bids of the volunteers in straight seniority order.

Thus, and during the step 130, the logical blocks 55b-55i (shown in FIG. 5) are designed to schedule a subset of crewmembers and trips, as detailed in steps 140-180. The ordering of the logical blocks 55b-55i is designed to produce an overall periodization amongst the entire group.

In an exemplary embodiment and returning to FIG. 6, the system 10 publishes the scheduling results at the step 135. The optimized transparent schedule includes a listing of shifts, with each shift being either assigned a crewmember from the plurality of crewmembers or having a status of uncovered; and a reason code associated with each rejected shift bid from the plurality of shift bids. At least a portion relating to each crewmember is presented or available to each crewmember that discloses his or her shift assignment from the optimized shift schedule and the reason code associated with his or her rejected shift bid and/or the reason code associated with his or her awarded shift bid.

In an exemplary embodiment, the reason code provided for a rejected shift bid of a crewmember includes any one of the following: a disclosure that the rejected shift bid if assigned, would increase the number of required moveable days; a disclosure that the rejected shift bid, if assigned, would increase the number of unassigned shifts having the status of uncovered; a disclosure that the rejected shift bid, if assigned, would increase the number of unassigned shifts having the status of uncovered in a group of crewmembers to which the crewmember belongs, wherein the group of crewmembers share the same number of available days; a disclosure that the rejected shift bid, if assigned, would increase the number of crewmembers in his or her group that do not have an assigned shift; a disclosure that rejected shift bid was awarded to another, more senior crewmember; a disclosure that the rejected shift bid violated a scheduling limitation associated with the crewmember; a disclosure that the rejected shift bid violated a business rule associated with the crewmember; and the like.

In an exemplary embodiment, the reason code provided for an awarded shift bid includes any one of the following: a disclosure that the rejected shift bid does not increase the number of required moveable days; a disclosure that the rejected shift bid does not increase the number of unassigned shifts having the status of uncovered; a disclosure that the rejected shift bid does not increase the number of unassigned shifts having the status of uncovered in a group of crewmembers to which the crewmember belongs, wherein the group of crewmembers share the same number of available days; a disclosure that the rejected shift bid does not increase the number of crewmembers in his or her group that do not have an assigned shift; a disclosure that rejected shift bid was awarded to another, more senior crewmember; a disclosure that the trip associated with the shift bid has a length in days that is equal to the crewmember's availability; a disclosure that the crewmember has more seniority than other crewmembers that submitted identical or similar shift bids; and the like.

In several exemplary embodiments, the iterative work of solving multiple mathematical problems or running the iterations of the Assignment Model 60a, using the system 10, in accordance with one or more exemplary embodiments of the present disclosure, allows company management to execute an award process in the optimum fashion. At the same time, the design of iterative approach of the system 10 allows the management to provide clear reason code in the event of a bid is awarded or rejected.

In several exemplary embodiments, prior application of shift scheduling optimization models failed to provide transparency. While conventional shift scheduling optimization models excel at determining maximum coverage or implementing limited constraints, each suffers from its inability of providing reasoning why one shift bid was awarded and another shift bid was rejected. Exemplary embodiments of the present disclosure, based on an iterative design, are able to overcome this disadvantage and provide transparency into the reasoning of rejected and/or awarded bids.

In the technology of employee shift scheduling processing, employees may submit a request to work certain days or shifts and/or submit a request to not work certain days or shifts. An overall system solution, or schedule is then generated using a processor with some of the employee submittals being granted and other denied. When the schedule is generated using an algorithm, the goal or objective of the algorithm is to maximize or minimize selected parameters (e.g., total coverage of all shifts, minimize employees that have no assigned shifts, etc.). While the schedule may meet the goal or objective, no reasons are provided as to why one specific employee's request was denied. This may result in a decrease in the employee's satisfaction with the schedule. Thus, a schedule that is transparent as to why an employee's request was denied is needed in the technology of employee shift scheduling processing.

In several exemplary embodiments, as a result of the operation of the system or the execution of the method of the present disclosure, requests associated with an unlimited number of users can be assigned or denied while honoring seniority and equity requirements, which results in a solution or schedule that honors seniority and equity requirements. In several exemplary embodiments, as a result of the operation of the system 10 or the execution of the method 100 of the present disclosure, a transparent schedule is generated that includes a reason code as to why an employee's or crewmember's request was denied or granted (i.e., a reason code or a denial/grant information) for each user of the system. This transparency will allow a user of the system to understand why his or her request was or was not satisfied, which should increase the user's satisfaction with the schedule. Data relating to the reasons why an employee's request was denied or granted (i.e., a reason code or denial/grant information) is stored in a database and may be presented to the user via a graphical user interface. Thus, as a result of the operation of the system 10 or the execution of the method 100 of the present disclosure, the ability of the system 10 to display information regarding the employee's request and therefore, interact with the user, is improved. In an exemplary embodiment, the denial/grant information or reason code is stored in a database along with the employee's assigned schedule or shifts. Thus, the computer 25 or the remote user device 15 may simultaneously display the employee's assigned schedule or shifts and the reason code or denial/grant information specific to that employee's requests. In an exemplary embodiment, and as a result of the operation of the system 10 or the execution of the method 100 of the present disclosure, the schedule or solution includes the reason code or denial/grant information for each user or crewmember. Thus, as a result of the operation of the system or the execution of the method of the present disclosure, the technology of employee shift scheduling processing is improved by providing an optimized schedule that includes the reason code or denial/grant information for each user or employee of the system.

While a processor executing a conventional optimization algorithm, which is rooted in computer technology, generates an optimum solution, the processor does not provide specific reasons or data as to why the optimum solution is the optimum solution, such as why an employee's shift request was denied. This results in a lack of transparency in the optimum solution.

In several exemplary embodiments, as a result of the operation of the system 10 or the execution of the method 100 of the present disclosure, the optimization algorithm generates an optimum solution that includes the denial/grant information for each user of the system. Specifically, the system 10 generates the reason code or denial/grant information for each request using constraints and/or decision variables. The generation of reason codes improves the currently technology regarding optimization algorithms. Specifically, the generation of reason codes overcomes the problem of insufficient transparency regarding optimum solutions generated by conventional optimization algorithms. The generation of reason codes allows a user of the system to understand why his or her request was or was not satisfied, which should increase the user's satisfaction with the schedule. In several exemplary embodiments, as a result of the operation of the system 10 or the execution of the method 100 of the present disclosure, the optimization algorithm generates and stores the reason code for each submitted employee request automatically. In an exemplary embodiment, the generation and storage of the reason code for each submitted employee request enables logic checks to be performed therefore increases the satisfaction and confidence of the optimum solution. The unconventional step of automatically generating and storing the reason code for each submitted employee request overcomes the problem rooted in computer technology relating to computer-implemented optimization algorithms, which is the lack of transparency relating to the optimum solution.

In several exemplary embodiments, the combination and order of the steps in the method 100 results in the operation or execution of a scheduling algorithm in a non-conventional and non-generic way to ensure that each rejected bid and/or awarded bid is associated with a reason code. In combination, the steps of the method 100 set up a sequence of events that address unique problems (e.g., lack of transparency as to why a shift bid was rejected or denied) associated with the convention methods of optimized shift scheduling. Thus, the method 100 and the system 10 involve a specific, discrete implementation of optimized shift scheduling. The combination of solving multiple mathematical problems allows the assignment and award of shifts in an optimum fashion while the iterative approach to each shift bid allows a clear reason code to be provided when the bid is awarded or rejected. Identifying a reason code and associating a reason code for each rejected and/or awarded bid is a process or step that differs from the routine and conventional sequence of events normally conducted during optimized shift scheduling, specifically when the optimized shift scheduling is determined via algorithms or other mathematical models.

Figure 12:
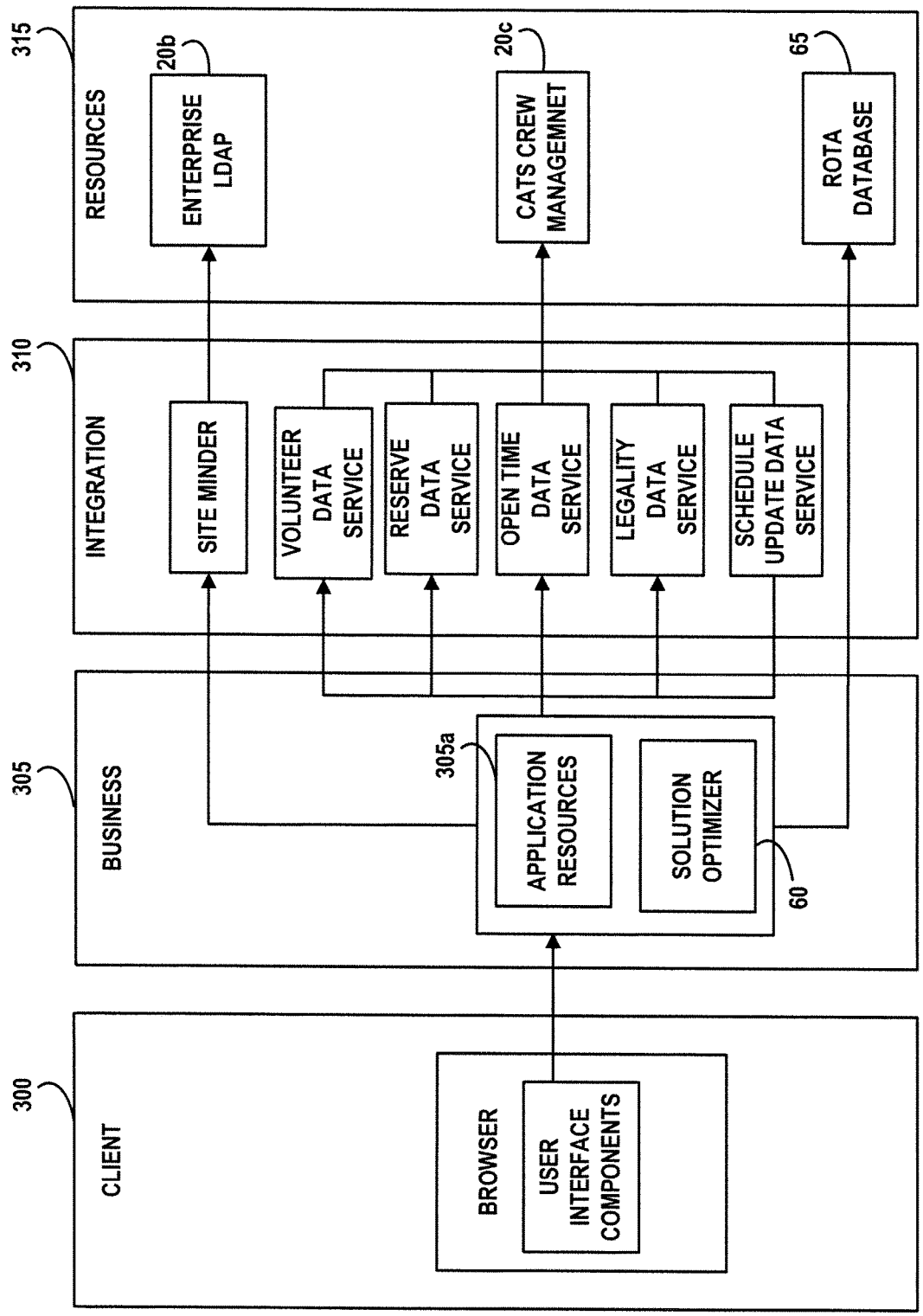
FIG. 12 is a logical architecture view of the system of FIG. 1, according to an exemplary embodiment.

FIG. 12 illustrates a logical architecture view through a client tier 300, a business tier 305, an integration tier 310, and a resources tier 315, during the execution of the method 100, according to an exemplary embodiment. In an exemplary embodiment, the client 300 includes an HTML 5 compliant browser. In an exemplary embodiment, the business 305 includes application resources 305a and the solution optimizer 60. In an exemplary embodiment, the application is a .Net based web application. The application resources 305a identified represent the business logic and resources supporting the User Interface. The solution optimizer 60 is Gruobi. In an exemplary embodiment, and regarding the integration 310, the application leverages an MQ-based data services provided by Crew Management System 20c. The application relies on SiteMinder for authentication. In an exemplary embodiment and regarding the resources 315, the ROTA database schema resides in AirOps.

Figure 13:
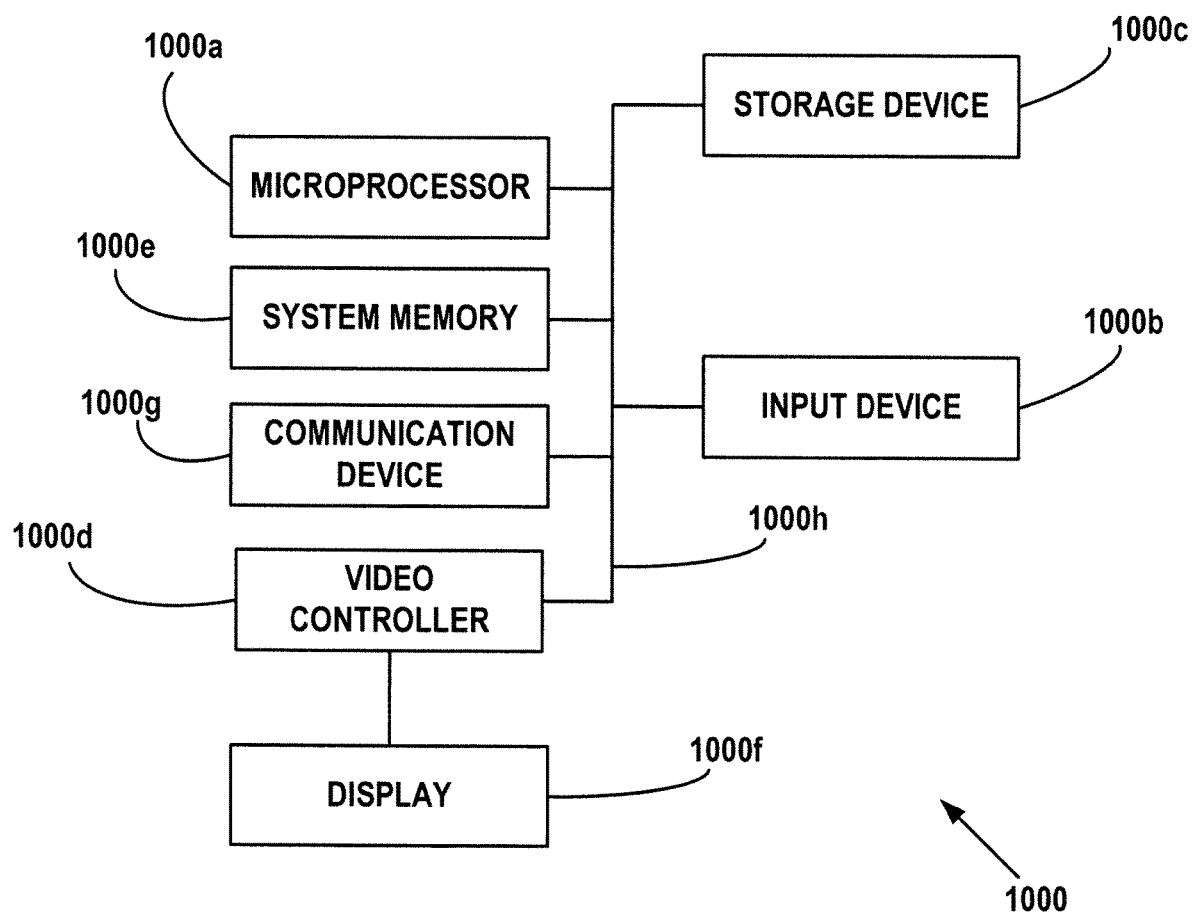
FIG. 13 is a diagrammatic illustration of a node for implementing one or more exemplary embodiments of the present disclosure, according to an exemplary embodiment.

In an exemplary embodiment, as illustrated in FIG. 13 with continuing reference to FIGS. 1-6, 7A, 7B, 8, 9A, 9B, and 10-12, an illustrative node 1000 for implementing one or more of the exemplary embodiments described above, illustrated in FIGS. 1-6, 7A, 7B, 8, 9A, 9B, and 10-12 is depicted. The node 1000 includes a microprocessor 1000a, an input device 1000b, a memory unit or storage device 1000c, a video controller 1000d, a memory unit or system memory 1000e, a display 1000f, and a communication device 1000g all interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the systems described above, illustrated in FIGS. 1-6, 7A, 7B, 8, 9A, 9B, and 10-12, include at least the node 1000 and/or components thereof, and/or one or more nodes that are substantially similar to the node 1000 and/or components thereof. In several exemplary embodiments, one or more of the above-described components of the node 1000 and/or the system 10 include respective pluralities of same components.

In several exemplary embodiments, one or more of the applications, systems, and application programs described above, illustrated in FIGS. 1-6, 7A, 7B, 8, 9A, 9B, and 10-12, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several exemplary embodiments pulls real-time information from one or more servers, automatically refreshing with latest information at a predetermined time increment; or any combination thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a non-transitory computer readable medium, or stored in memory unit, may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of generating a transparent optimized shift schedule for a plurality of crewmembers, the method includes executing a plurality of instructions with at least one processor of at least one computing device, the at least one computing device further including at least one memory unit in which the instructions are stored; wherein the instructions are executed with the at least one processor so that the following steps are executed: identifying a plurality of unassigned shifts to be assigned in the transparent optimized shift schedule; identifying the plurality of crewmembers, each crewmember from the plurality of crewmembers to be assigned an unassigned shift from the plurality of unassigned shifts; receiving a set of rules relating to each crewmember from the plurality of crewmembers; receiving a plurality of shift bids submitted by one of more crewmembers from the plurality of crewmembers, wherein each shift bid from the plurality of shift bids is to be either awarded or rejected; generating, using the set of rules, the plurality of shift bids, and the plurality of unassigned shifts, the transparent optimized shift schedule for the plurality of crewmembers; wherein the transparent optimized shift schedule includes: a listing of shifts, with each shift being either assigned a crewmember from the plurality of crewmembers or unassigned having a status of uncovered; and a reason code associated with each rejected shift bid from the plurality of shift bids; wherein generating the transparent optimized shift schedule for the plurality of crewmembers includes: generating, without reference to the plurality of shift bids, a first optimum solution having a number of unassigned shifts having a status of uncovered and a number of required moveable days; awarding one or more shift bids from the plurality of shift bids, wherein the award of each of the one or more shift bids does not increase the number of required moveable days and does not increase the number of unassigned shifts having the status of uncovered; classifying one or more shift bids from the plurality of shift bids as rejected shift bids, wherein the award of each of the rejected shift bids would increase the number of required moveable days or would increase the number of unassigned shifts having the status of uncovered; associating a reason code with each of the rejected shift bids; and assigning an unassigned shift from the plurality of unassigned shifts to each crewmember who submitted a shift bid classified as a rejected shift bid; presenting to each crewmember from the plurality of crewmembers his or her shift assignment from the transparent optimized shift schedule; and presenting, to each crewmember from the plurality of crewmembers who submitted a shift bid classified as a rejected shift bid, the reason code associated with his or her rejected shift bid; wherein presenting, to each crewmember from the plurality of crewmembers who submitted a shift bid classified as a rejected shift bid, his or her shift assignment from the optimized shift schedule and the reason code associated with his or her rejected shift bid provides transparency as to why each rejected shift bid was rejected. In an exemplary embodiment, the reason code associated with the rejected shift bid that, if awarded, would increase the number of required moveable days, discloses that the rejected shift bid, if awarded, would increase the number of moveable days; and the reason code associated with the rejected shift bid that, if awarded, would increase the number of shifts having the status of uncovered, discloses that the rejected shift bid, if awarded, would increase the number of shifts having the status of uncovered. In an exemplary embodiment, generating the first optimum solution includes solving a plurality of mixed integer program assignment models that are arranged in a hierarchical order; wherein each mixed integer program assignment model from the plurality of mixed integer program assignment models is associated with at least one constraint function; and wherein each successive mixed integer program assignment model is solved using the at least one constraint function from each previously solved mixed integer program assignment model. In an exemplary embodiment, the method also includes identifying foreign language crewmembers that satisfy a foreign language requirement from the plurality of crewmembers; identifying foreign-language-required unassigned shifts that must be assigned to a foreign language crewmember from the plurality of unassigned shifts; for each foreign language crewmember, identifying legal, unassigned shifts, from the plurality of foreign-language-required unassigned shifts, that satisfy the set of rules associated with the each foreign language crewmember; ranking the foreign language crewmembers according to seniority; starting with the most senior foreign language crewmember and for each less-senior foreign language crewmember thereafter, matching legal, unassigned shifts associated with the foreign language crewmember to shift bids of the most senior foreign language crewmember; determining whether the legal, unassigned shift that matched with a shift bid would not increase the number of moveable days if awarded; and determining whether the legal, unassigned shift that matched with the shift bid would not increase the number of unassigned shifts having the status of uncovered; wherein awarding the shift bid from the plurality of shift bids when the award of the shift bid would not increase the number of required moveable days and would not increase the number of unassigned shifts having the status of uncovered includes awarding the legal, unassigned shift that matched with the shift bid to the most senior foreign language crewmember after determining that the legal, unassigned shift that matched with the shift bid would not increase the number of required moveable days if awarded and that the legal, unassigned shift that matched with the shift bid would not increase the number of unassigned shifts having the status of uncovered. In an exemplary embodiment, the method also includes determining, for each foreign language crewmember, a crewmember's availability in days; grouping the foreign language crewmembers into groups based on the crewmembers' availability in days; determining whether the legal, unassigned shift that matched with the shift bid of the most senior foreign language crew member has a number of days that is greater than the most senior foreign language crewmember's availability; if the legal, unassigned shift that matched with the shift bid of the most senior foreign language crew member has a number of days that is greater than the most senior foreign language crewmember's availability, then solving a first mathematical model to determine whether the legal, unassigned shift that matched with the shift bid of the most senior foreign language crew member, if awarded, would increase a number of crewmembers in his or her group that does not have an assigned shift; classifying the shift bid associated with the most senior foreign language crewmember as a rejected shift bid when, if awarded, the shift bid would increase the number of crewmembers in his or her group that does not have an assigned shift; determining whether the legal, unassigned shift that matched with the shift bid of the most senior foreign language crew member has a number of days that is less than the most senior foreign language crewmember's availability; if the legal, unassigned shift that matched with the shift bid of the most senior foreign language crew member has a number of days that is less than the most senior foreign language crewmember's availability, then solving a second mathematical model to determine whether the legal, unassigned shift that matched with the shift bid of the most senior foreign language crew member, if awarded, would increase a number of unassigned shifts having the status of uncovered in his or her group; classifying the shift bid associated with the most senior foreign language crewmember as a rejected shift bid when, if awarded, the shift bid would increase the number of unassigned shifts having the status of uncovered in his or her group; awarding the shift bid associated with the most senior foreign language crewmember when the award of the shift bid would not increase the number of crewmembers in his or her group that do not have an assigned shift and would not increase the number of unassigned shifts having the status of uncovered in his or her group. In an exemplary embodiment, the reason code associated with the rejected shift bid that, if awarded, would increase the number of unassigned shifts having the status of uncovered in his or her group discloses that the rejected shift bid, if awarded, would increase the number of unassigned shifts having the status of uncovered in his or her group; and the reason code associated with the rejected shift bid that, if awarded, would increase the number of crewmembers in his or her group that do not have an assigned shift discloses that the rejected shift bid, if awarded, would increase the number of crewmembers in his or her group that do not have an assigned shift. In an exemplary embodiment, the method also includes generating a first constraint function when the shift bid associated with the most senior foreign language crewmember is awarded to reflect that the legal, unassigned shift that matched with the shift bid of the most senior foreign language crew member is an awarded shift; and generating a second optimum solution by solving a plurality of mixed integer program assignment models in an hierarchical order using the first constraint function to reflect that the legal, unassigned shift that matched with the shift bid of the most senior foreign language crew member is an awarded shift, wherein each mixed integer program assignment model from the plurality of mixed integer program assignment models is associated with at least one other constraint function; wherein each successive mixed integer program assignment model is solved using the at least one other constraint function from each previously solved mixed integer program assignment model and the first constraint function; and wherein the second optimum solution has the same number of shifts having the status of uncovered, and the same number of required moveable days, as the first optimum solution. In an exemplary embodiment, where each shift bid from the plurality of shift bids that is submitted by a crewmember includes one of the following: a preference requesting that the crewmember remain on call; a preference requesting a shift with fewer days than the crewmember's availability; a preference requesting a shift with more days than the crewmember's availability; a preference requesting a shift with equal days as the crewmember's availability; a preference requesting a shift designated as an international premium shift; a preference requesting an on-premise-reserve shift with fewer days than the crewmember's availability; a preference requesting an on-premise-reserve shift with more days than the crewmember's availability; a preference requesting an on-premise-reserve shift with equal days as the crewmember's availability; and a preference requesting a trip that is not a foreign-language-required unassigned trip when the crewmember is a crewmember that satisfies a foreign language requirement. In an exemplary embodiment, each crewmember from the plurality of crewmembers is an airline crewmember and is classified into one of the following: a first group of crewmembers, the crewmembers in the first group satisfying a foreign language requirement and being required to be assigned an unassigned shift; a second group of crewmembers, the crewmembers in the second group satisfying a foreign language requirement, not being required to be assigned an unassigned shift, but having submitted a shift bid; a third group of crewmembers, the crewmembers in the third group not satisfying a foreign language requirement and being required to be assigned an unassigned shift; and a fourth group of crewmembers, the crewmembers in the fourth group not satisfying a foreign language requirement, not being required to be assigned an unassigned shift, but having submitted a shift bid. In an exemplary embodiment, wherein generating the optimized shift schedule for the plurality of crewmembers includes: sorting the first, second, third, and fourth groups in an hierarchal arrangement; and generating, in succession and based on the hierarchal arrangement, at least a portion of the optimized shift schedule for each of the first, second, third, and fourth groups thereby allowing the reason codes to be associated with the rejected shift bids and presented to the crewmembers associated with the rejected shift bids.

In an exemplary embodiment, each of the shift bids is to be either awarded or rejected. In an exemplary embodiment, awarding a shift bid is assigning the shift bid.

The present disclosure introduces an apparatus adapted to generate a transparent optimized shift schedule for a plurality of crewmembers, the apparatus includes: a non-transitory computer readable medium having stored thereon a plurality of instructions, wherein the instructions are executed with at least one processor so that the following steps are executed: identifying a plurality of unassigned shifts to be assigned in the transparent optimized shift schedule; identifying the plurality of crewmembers, each crewmember from the plurality of crewmembers to be assigned an unassigned shift from the plurality of unassigned shifts; receiving a set of rules relating to each crewmember from the plurality of crewmembers; receiving a plurality of shift bids submitted by one of more crewmembers from the plurality of crewmembers, wherein each shift bid from the plurality of shift bids is to be either awarded or rejected; generating, using the set of rules, the plurality of shift bids, and the plurality of unassigned shifts, the transparent optimized shift schedule for the plurality of crewmembers; wherein the transparent optimized shift schedule includes: a listing of shifts, with each shift being either assigned a crewmember from the plurality of crewmembers or unassigned having a status of uncovered; and a reason code associated with each rejected shift bid from the plurality of shift bids; wherein generating the transparent optimized shift schedule for the plurality of crewmembers includes: generating, without reference to the plurality of shift bids, a first optimum solution having a number of unassigned shifts having a status of uncovered and a number of required moveable days; awarding one or more shift bids from the plurality of shift bids, wherein the award of each of the one or more shift bids does not increase the number of required moveable days and does not increase the number of unassigned shifts having the status of uncovered; classifying one or more shift bids from the plurality of shift bids as rejected shift bids, wherein the award of each of the rejected shift bids would increase the number of required moveable days or would increase the number of unassigned shifts having the status of uncovered; associating a reason code with each of the rejected shift bids; and assigning an unassigned shift from the plurality of unassigned shifts to each crewmember who submitted a shift bid classified as a rejected shift bid; presenting to each crewmember from the plurality of crewmembers his or her shift assignment from the transparent optimized shift schedule; and presenting, to each crewmember from the plurality of crewmembers who submitted a shift bid classified as a rejected shift bid, the reason code associated with his or her rejected shift bid; wherein presenting, to each crewmember from the plurality of crewmembers who submitted a shift bid classified as a rejected shift bid, his or her shift assignment from the optimized shift schedule and the reason code associated with his or her rejected shift bid provides transparency as to why each rejected shift bid was rejected. In an exemplary embodiment, the reason code associated with the rejected shift bid that, if awarded, would increase the number of required moveable days, discloses that the rejected shift bid, if awarded, would increase the number of moveable days; and the reason code associated with the rejected shift bid that, if awarded, would increase the number of shifts having the status of uncovered, discloses that the rejected shift bid, if awarded, would increase the number of shifts having the status of uncovered. In an exemplary embodiment, generating the first optimum solution includes solving a plurality of mixed integer program assignment models that are arranged in a hierarchical order; wherein each mixed integer program assignment model from the plurality of mixed integer program assignment models is associated with at least one constraint function; and wherein each successive mixed integer program assignment model is solved using the at least one constraint function from each previously solved mixed integer program assignment model. In an exemplary embodiment, wherein the instructions are executed with the at least one processor so that the following additional steps are executed: identifying foreign language crewmembers that satisfy a foreign language requirement from the plurality of crewmembers; identifying foreign-language-required unassigned shifts that must be assigned to a foreign language crewmember from the plurality of unassigned shifts; for each foreign language crewmember, identifying legal, unassigned shifts, from the plurality of foreign-language-required unassigned shifts, that satisfy the set of rules associated with the each foreign language crewmember; ranking the foreign language crewmembers according to seniority; starting with the most senior foreign language crewmember and for each less-senior foreign language crewmember thereafter, matching legal, unassigned shifts associated with the foreign language crewmember to shift bids of the most senior foreign language crewmember; determining whether the legal, unassigned shift that matched with a shift bid would not increase the number of moveable days if awarded; and determining whether the legal, unassigned shift that matched with the shift bid would not increase the number of unassigned shifts having the status of uncovered; wherein awarding the shift bid from the plurality of shift bids when the award of the shift bid would not increase the number of required moveable days and would not increase the number of unassigned shifts having the status of uncovered includes awarding the legal, unassigned shift that matched with the shift bid to the most senior foreign language crewmember after determining that the legal, unassigned shift that matched with the shift bid would not increase the number of required moveable days if awarded and that the legal, unassigned shift that matched with the shift bid would not increase the number of unassigned shifts having the status of uncovered. In an exemplary embodiment, wherein the instructions are executed with the at least one processor so that the following additional steps are executed: determining, for each foreign language crewmember, a crewmember's availability in days; grouping the foreign language crewmembers into groups based on the crewmembers' availability in days; determining whether the legal, unassigned shift that matched with the shift bid of the most senior foreign language crew member has a number of days that is greater than the most senior foreign language crewmember's availability; if the legal, unassigned shift that matched with the shift bid of the most senior foreign language crew member has a number of days that is greater than the most senior foreign language crewmember's availability, then solving a first mathematical model to determine whether the legal, unassigned shift that matched with the shift bid of the most senior foreign language crew member, if awarded, would increase a number of crewmembers in his or her group that does not have an assigned shift; classifying the shift bid associated with the most senior foreign language crewmember as a rejected shift bid when, if awarded, the shift bid would increase the number of crewmembers in his or her group that does not have an assigned shift; determining whether the legal, unassigned shift that matched with the shift bid of the most senior foreign language crew member has a number of days that is less than the most senior foreign language crewmember's availability; if the legal, unassigned shift that matched with the shift bid of the most senior foreign language crew member has a number of days that is less than the most senior foreign language crewmember's availability, then solving a second mathematical model to determine whether the legal, unassigned shift that matched with the shift bid of the most senior foreign language crew member, if awarded, would increase a number of unassigned shifts having the status of uncovered in his or her group; classifying the shift bid associated with the most senior foreign language crewmember as a rejected shift bid when, if awarded, the shift bid would increase the number of unassigned shifts having the status of uncovered in his or her group; awarding the shift bid associated with the most senior foreign language crewmember when the award of the shift bid would not increase the number of crewmembers in his or her group that do not have an assigned shift and would not increase the number of unassigned shifts having the status of uncovered in his or her group. In an exemplary embodiment, the reason code associated with the rejected shift bid that, if awarded, would increase the number of unassigned shifts having the status of uncovered in his or her group discloses that the rejected shift bid, if awarded, would increase the number of unassigned shifts having the status of uncovered in his or her group; and the reason code associated with the rejected shift bid that, if awarded, would increase the number of crewmembers in his or her group that do not have an assigned shift discloses that the rejected shift bid, if awarded, would increase the number of crewmembers in his or her group that do not have an assigned shift. In an exemplary embodiment, wherein the instructions are executed with the at least one processor so that the following additional steps are executed: generating a first constraint function when the shift bid associated with the most senior foreign language crewmember is awarded to reflect that the legal, unassigned shift that matched with the shift bid of the most senior foreign language crew member is an awarded shift; and generating a second optimum solution by solving a plurality of mixed integer program assignment models in an hierarchical order using the first constraint function to reflect that the legal, unassigned shift that matched with the shift bid of the most senior foreign language crew member is an awarded shift, wherein each mixed integer program assignment model from the plurality of mixed integer program assignment models is associated with at least one other constraint function; wherein each successive mixed integer program assignment model is solved using the at least one other constraint function from each previously solved mixed integer program assignment model and the first constraint function; and wherein the second optimum solution has the same number of shifts having the status of uncovered, and the same number of required moveable days, as the first optimum solution. In an exemplary embodiment, where each shift bid from the plurality of shift bids that is submitted by a crewmember includes one of the following: a preference requesting that the crewmember remain on call; a preference requesting a shift with fewer days than the crewmember's availability; a preference requesting a shift with more days than the crewmember's availability; a preference requesting a shift with equal days as the crewmember's availability; a preference requesting a shift designated as an international premium shift; a preference requesting an on-premise-reserve shift with fewer days than the crewmember's availability; a preference requesting an on-premise-reserve shift with more days than the crewmember's availability; a preference requesting an on-premise-reserve shift with equal days as the crewmember's availability; and a preference requesting a trip that is not a foreign-language-required unassigned trip when the crewmember is a crewmember that satisfies a foreign language requirement. In an exemplary embodiment, each crewmember from the plurality of crewmembers is an airline crewmember and is classified into one of the following: a first group of crewmembers, the crewmembers in the first group satisfying a foreign language requirement and being required to be assigned an unassigned shift; a second group of crewmembers, the crewmembers in the second group satisfying a foreign language requirement, not being required to be assigned an unassigned shift, but having submitted a shift bid; a third group of crewmembers, the crewmembers in the third group not satisfying a foreign language requirement and being required to be assigned an unassigned shift; and a fourth group of crewmembers, the crewmembers in the fourth group not satisfying a foreign language requirement, not being required to be assigned an unassigned shift, but having submitted a shift bid. In an exemplary embodiment, wherein generating the optimized shift schedule for the plurality of crewmembers includes: sorting the first, second, third, and fourth groups in an hierarchal arrangement; and generating, in succession and based on the hierarchal arrangement, at least a portion of the optimized shift schedule for each of the first, second, third, and fourth groups thereby allowing the reason codes to be associated with the rejected shift bids and presented to the crewmembers associated with the rejected shift bids.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, aspects of the present disclosure are readily applicable and/or readily adaptable to awarding time and/or scheduling crewmember (or employee) work hours in other industries such as, for example, the healthcare industry (e.g., generating work schedules for nurses and/or other medical professionals within the next 24 hours, the next week, etc.).

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of generating a transparent optimized shift schedule for a plurality of crewmembers, the method comprising executing a plurality of instructions with at least one processor of at least one computing device, the at least one computing device further comprising at least one memory unit in which the instructions are stored;
   wherein the instructions are executed with the at least one processor so that the following steps are executed:
   a crew portal receiving a plurality of shift bids submitted by one of more crewmembers from the plurality of crewmembers;
   wherein the crew portal comprises a crew portal web site that is displayed on a remote user device;
   wherein the plurality of bids is associated with a time period;
   and
   wherein the crew portal web site is an access point that allows crewmembers to interact with a schedule application that is stored on a computer that is different from the remote user device;
   an admin web site receiving a selected time period that includes the time period associated with the plurality of bids;
   wherein the admin web site is displayed on another remote user device that is different from each of the remote user device and the computer;
   the schedule application communicating with a crew management system via web service calls to identify a plurality of unassigned shifts to be assigned in the transparent optimized shift schedule;
   wherein the plurality of unassigned shifts is associated with the selected time period;
   the schedule application communicating with the crew management system via web service calls to identify the plurality of crewmembers, each crewmember from the plurality of crewmembers to be assigned an unassigned shift from the plurality of unassigned shifts;
   the schedule application accessing a set of rules from source data relating to each crewmember from the plurality of crewmembers;
   the schedule application receiving the plurality of shift bids submitted to the crew portal by one of more crewmembers from the plurality of crewmembers, wherein each shift bid from the plurality of shift bids is to be either awarded or rejected;
   wherein the schedule application comprises an assignment model, a crew group release model, a trip group release model, and a bid award model; and
   wherein the assignment model comprises first, second, third, fourth, fifth, sixth, seventh, and eighth mixed integer program assignment models arranged in a hierarchical order, with each of the first, second, third, fourth, fifth, sixth, seventh, and eighth mixed integer program assignment model having a different objective function;
   generating, by the assignment model of the schedule application and using the plurality of unassigned shifts, the plurality of crewmembers, and the set of rules and without reference to the plurality of shift bids, a first optimum solution;
   wherein generating the first optimum solution comprises:
   the assignment model solving the first mixed integer program assignment model using a first set of constraints;
   wherein the objective of the first mixed integer program assignment model is minimizing uncovered trips that have a length of one, two, three, or four days; and
   wherein solving the first mixed integer program assignment model results in a first hand-off constraint;
   the assignment model solving the second mixed integer program assignment model using a second set of constraints;
   wherein the objective of the second mixed integer program assignment model is minimizing a number of total reserves that would be forced to work on three of their moveable days;
   wherein the second set of constraints comprises the first set of constraints and the first hand-off constraint; and
   wherein solving the second mixed integer program assignment model results in a second hand-off constraint;
   the assignment model solving the third mixed integer program assignment model using a third set of constraints;
   wherein the objective of the third mixed integer program assignment model is minimizing a number of total reserves that would be forced to work on two of their moveable days;
   wherein the third set of constraints comprises the second set of constraints and the second hand-off constraint; and
   wherein solving the third mixed integer program assignment model results in a third hand-off constraint;
   the assignment model solving the fourth mixed integer program assignment model using a fourth set of constraints;
   wherein the objective of the fourth mixed integer program assignment model is minimizing a number of total reserves that would be forced to work on one of their moveable days;
   wherein the fourth set of constraints comprises the third set of constraints and the third hand-off constraint; and
   wherein solving the fourth mixed integer program assignment model results in a fourth hand-off constraint;
   the assignment model solving the fifth mixed integer program assignment model using a fifth set of constraints;
   wherein the objective of the fifth mixed integer program assignment model is minimizing the number of uncovered trips that have a length of four days;
   wherein the fifth set of constraints comprises the fourth set of constraints and the fourth hand-off constraint; and
   wherein solving the fifth mixed integer program assignment model results in a fifth hand-off constraint;
   the assignment model solving the sixth mixed integer program assignment model using a sixth set of constraints;

wherein the objective of the sixth mixed integer program assignment model is minimizing the number of uncovered trips that have a length of three days;
wherein the sixth set of constraints comprises the fifth set of constraints and the fifth hand-off constraint; and
wherein solving the sixth mixed integer program assignment model results in a sixth hand-off constraint;
the assignment model solving the seventh mixed integer program assignment model using a seventh set of constraints;
wherein the objective of the seventh mixed integer program assignment model is minimizing the number of uncovered trips that have a length of two days;
wherein the seventh set of constraints comprises the sixth set of constraints and the sixth hand-off constraint; and
wherein solving the seventh mixed integer program assignment model results in a seventh hand-off constraint;
and
the assignment model solving the eighth mixed integer program assignment model using an eighth set of constraints;
wherein the objective of the eighth mixed integer program assignment model is minimizing the number of uncovered trips that have a length of one day; and
wherein the eighth set of constraints comprises the seventh set of constraints and the seventh hand-off constraint;
wherein the first optimum solution includes:
a number of unassigned shifts having the status of uncovered; and
a number of required moveable days;
wherein a moveable day is a day associated with a crewmember of the plurality of crewmembers working while the crewmember is designated as a reserve;
after generating the first optimum solution, the assignment model of the schedule application generating, using the set of rules, the plurality of shift bids, the plurality of unassigned shifts, and the first optimum solution, the transparent optimized shift schedule for the plurality of crewmembers;
wherein the transparent optimized shift schedule comprises:
a listing of shifts, with each shift being either assigned a crewmember from the plurality of crewmembers or unassigned having a status of uncovered; and
a reason code associated with each rejected shift bid from the plurality of shift bids;
wherein generating the transparent optimized shift schedule for the plurality of crewmembers comprises:
the schedule application identifying foreign language crewmembers that satisfy a foreign language requirement from the plurality of crewmembers;
the schedule application identifying foreign-language-required unassigned shifts that must be assigned to a foreign language crewmember from the plurality of unassigned shifts;

for each foreign language crewmember, the schedule application identifying legal, unassigned shifts, from the plurality of foreign-language-required unassigned shifts, that satisfy the set of rules associated with the each foreign language crewmember;
the schedule application ranking the foreign language crewmembers according to seniority; and
starting with the most senior foreign language crewmember and for each less-senior foreign language crewmember thereafter:
the schedule application matching legal, unassigned shifts associated with the foreign language crewmember to shift bids of the most senior foreign language crewmember;
the bid award model determining whether the legal, unassigned shift that matched with a shift bid of the most senior foreign language crew member would increase the number of moveable days of the first optimum solution if awarded;
the bid award model classifying the legal, unassigned shift that matched with the shift bid of the most senior foreign language crew member as a rejected shift bid when the award of the legal, unassigned shift would increase the number of required moveable days of the first optimum solution;
the bid award model generating a reason code for the rejected shift bid indicating that the rejected shift bid was rejected because it would have increased the number of required moveable days of the first optimum solution;
the bid award model storing the reason code for the rejected shift bid indicating that the rejected shift bid was rejected because it would have increased the number of required moveable days of the first optimum solution in the at least one memory unit;
the bid award model determining whether the legal, unassigned shift that matched with the shift bid of the most senior foreign language crew member would increase the number of unassigned shifts of the optimum solution having the status of uncovered;
the bid award model classifying the legal, unassigned shift that matched with the shift bid of the most senior foreign language crew member as a rejected shift bid, when the award of the legal, unassigned shift would increase the number of unassigned shifts of the optimum solution having the status of uncovered;
the bid award model generating a reason code for the rejected shift bid indicating that the rejected shift bid was rejected because it would increase the number of unassigned shifts of the optimum solution having the status of uncovered;
the bid award model storing the reason code for the rejected shift bid indicating that the rejected shift bid was rejected because it would increase the number of unassigned shifts of the optimum solution having the status of uncovered in the at least one memory unit; and
the bid award model awarding the legal, unassigned shift that matched with the shift bid of the most senior foreign language crew member to the most senior foreign language crewmember after determining that the legal, unassigned shift that matched with the shift bid of the most senior foreign language crew member would not increase the number of required moveable days of the first optimum solution and that the legal, unassigned shift that matched with the shift bid of the most senior foreign language crew member would not increase the number of unassigned shifts of the optimum solution having the status of uncovered;

the schedule application sending the transparent optimized shift schedule to the crew management system; and the crew portal web site displaying a reason why a rejected shift bid was rejected.

2. The method of claim 1, further comprising:

the schedule application determining, for each foreign language crewmember, a crewmember's availability in days;

the schedule application grouping the foreign language crewmembers into groups based on the crewmembers' availability in days;

the schedule application determining whether the legal, unassigned shift that matched with the shift bid of the most senior foreign language crew member has a number of days that is greater than the most senior foreign language crewmember's availability;

if the legal, unassigned shift that matched with the shift bid of the most senior foreign language crew member has a number of days that is greater than the most senior foreign language crewmember's availability, then the trip group release model solving a first mathematical model to determine whether the legal, unassigned shift that matched with the shift bid of the most senior foreign language crew member, if awarded, would increase a number of crewmembers in his or her group that does not have an assigned shift;

the bid award model classifying the shift bid associated with the most senior foreign language crewmember as a rejected shift bid when, if awarded, the shift bid would increase the number of crewmembers in his or her group that does not have an assigned shift;

the bid award model generating a reason code for the rejected shift bid indicating that the rejected shift bid was rejected because it would increase the number of crewmembers in his or her group that does not have an assigned shift;

the bid award model storing the reason code for the rejected shift bid indicating that the rejected shift bid was rejected because it would increase the number of crewmembers in his or her group that does not have an assigned shift in the at least one memory unit;

the schedule application determining whether the legal, unassigned shift that matched with the shift bid of the most senior foreign language crew member has a number of days that is less than the most senior foreign language crewmember's availability;

if the legal, unassigned shift that matched with the shift bid of the most senior foreign language crew member has a number of days that is less than the most senior foreign language crewmember's availability, then the crew group release model solving a second mathematical model to determine whether the legal, unassigned shift that matched with the shift bid of the most senior foreign language crew member, if awarded, would increase a number of unassigned shifts having the status of uncovered in his or her group;

the bid award model classifying the shift bid associated with the most senior foreign language crewmember as a rejected shift bid when, if awarded, the shift bid would increase the number of unassigned shifts having the status of uncovered in his or her group;

the bid award model generating a reason code for the rejected shift bid indicating that the rejected shift bid would increase the number of unassigned shifts having the status of uncovered in his or her group; and the bid award model storing the reason code for the rejected shift bid indicating that the rejected shift bid was rejected because it would increase the number of unassigned shifts having the status of uncovered in his or her group in the at least one memory unit;

wherein awarding the legal, unassigned shift that matched with the shift bid of the most senior foreign language crew member to the most senior foreign language crewmember is further after determining that the award of the shift bid would not increase the number of crewmembers in his or her group that do not have an assigned shift and would not increase the number of unassigned shifts having the status of uncovered in his or her group.

3. The method of claim 2, further comprising:

the schedule application generating an eighth constraint function when the shift bid associated with the most senior foreign language crewmember is awarded to reflect that the legal, unassigned shift that matched with the shift bid of the most senior foreign language crew member is an awarded shift; and the schedule application generating a second optimum solution by solving a plurality of mixed integer program assignment models in an hierarchical order using the eighth constraint function to reflect that the legal, unassigned shift that matched with the shift bid of the most senior foreign language crew member is an awarded shift, wherein the second optimum solution has the same number of shifts having the status of uncovered, and the same number of required moveable days, as the first optimum solution.

4. The method of claim 1, where each shift bid from the plurality of shift bids that is submitted by a crewmember includes one of the following: a preference requesting that the crewmember remain on call; a preference requesting a shift with fewer days than the crewmember's availability; a preference requesting a shift with more days than the crewmember's availability; a preference requesting a shift with equal days as the crewmember's availability; a preference requesting a shift designated as an international premium shift; a preference requesting an on-premise-reserve shift with fewer days than the crewmember's availability; a preference requesting an on-premise-reserve shift with more days than the crewmember's availability; a preference requesting an on-premise-reserve shift with equal days as the crewmember's availability; and a preference requesting a trip that is not a foreign-language-required unassigned trip when the crewmember is a crewmember that satisfies a foreign language requirement.

5. The method of claim 1, wherein each crewmember from the plurality of crewmembers is an airline crewmember and is classified into one of the following: a first group of crewmembers, the crewmembers in the first group satisfying a foreign language requirement and being required to be assigned an unassigned shift; a second group of crewmembers, the crewmembers in the second group satisfying a foreign language requirement, not being required to be assigned an unassigned shift, but having submitted a shift bid; a third group of crewmembers, the crewmembers in the third group not satisfying a foreign language requirement and being required to be assigned an unassigned shift; and a fourth group of crewmembers, the crewmembers in the fourth group not satisfying a foreign language requirement, not being required to be assigned an unassigned shift, but having submitted a shift bid.

6. The method of claim 5, wherein the schedule application generating the optimized shift schedule for the plurality of crewmembers comprises:
   the schedule application sorting the first, second, third, and fourth groups in an hierarchal arrangement; and
   the schedule application generating, in succession and based on the hierarchal arrangement, at least a portion of the optimized shift schedule for each of the first, second, third, and fourth groups thereby allowing the reason codes to be associated with the rejected shift bids and presented to the crewmembers associated with the rejected shift bids.

7. An apparatus adapted to generate a transparent optimized shift schedule for a plurality of crewmembers, the apparatus comprising:
   a non-transitory computer readable medium having stored thereon a plurality of instructions, wherein the instructions are executed with at least one processor so that the following steps are executed:
   a crew portal receiving a plurality of shift bids submitted by one of more crewmembers from the plurality of crewmembers;
      wherein the crew portal comprises a crew portal web site that is displayed on a remote user device;
      wherein the plurality of bids is associated with a time period;
      and
      wherein the crew portal web site is an access point that allows crewmembers to interact with a schedule application that is stored on a computer that is different from the remote user device;
   an admin web site receiving a selected time period that includes the time period associated with the plurality of bids;
      wherein the admin web site is displayed on another remote user device that is different from each of the remote user device and the computer;
   the schedule application communicating with a crew management system via web service calls to identify a plurality of unassigned shifts to be assigned in the transparent optimized shift schedule;
      wherein the plurality of unassigned shifts is associated with the selected time period;
   the schedule application communicating with the crew management system via web service calls to identify the plurality of crewmembers, each crewmember from the plurality of crewmembers to be assigned an unassigned shift from the plurality of unassigned shifts;
   the schedule application accessing a set of rules from source data relating to each crewmember from the plurality of crewmembers;
   the schedule application receiving the plurality of shift bids submitted to the crew portal by one of more crewmembers from the plurality of crewmembers, wherein each shift bid from the plurality of shift bids is to be either awarded or rejected;
      wherein the schedule application comprises an assignment model, a crew group release model, a trip group release model, and a bid award model; and
      wherein the assignment model comprises first, second, third, fourth, fifth, sixth, seventh, and eighth mixed integer program assignment models arranged in a hierarchical order, with each of the first, second, third, fourth, fifth, sixth, seventh, and eighth mixed integer program assignment model having a different objective function;
   generating, by the assignment model of the schedule application and using the plurality of unassigned shifts, the plurality of crewmembers, and the set of rules and without reference to the plurality of shift bids, a first optimum solution;
      wherein generating the first optimum solution comprises:
         the assignment model solving the first mixed integer program assignment model using a first set of constraints;
            wherein the objective of the first mixed integer program assignment model is minimizing uncovered trips that have a length of one, two, three, or four days; and
            wherein solving the first mixed integer program assignment model results in a first hand-off constraint;
         the assignment model solving the second mixed integer program assignment model using a second set of constraints;
            wherein the objective of the second mixed integer program assignment model is minimizing a number of total reserves that would be forced to work on three of their moveable days;
            wherein the second set of constraints comprises the first set of constraints and the first hand-off constraint; and
            wherein solving the second mixed integer program assignment model results in a second hand-off constraint;
         the assignment model solving the third mixed integer program assignment model using a third set of constraints;
            wherein the objective of the third mixed integer program assignment model is minimizing a number of total reserves that would be forced to work on two of their moveable days;
            wherein the third set of constraints comprises the second set of constraints and the second hand-off constraint; and
            wherein solving the third mixed integer program assignment model results in a third hand-off constraint;
         the assignment model solving the fourth mixed integer program assignment model using a fourth set of constraints;
            wherein the objective of the fourth mixed integer program assignment model is minimizing a number of total reserves that would be forced to work on one of their moveable days;
            wherein the fourth set of constraints comprises the third set of constraints and the third hand-off constraint; and
            wherein solving the fourth mixed integer program assignment model results in a fourth hand-off constraint;

the assignment model solving the fifth mixed integer program assignment model using a fifth set of constraints;
wherein the objective of the fifth mixed integer program assignment model is minimizing the number of uncovered trips that have a length of four days;
wherein the fifth set of constraints comprises the fourth set of constraints and the fourth hand-off constraint; and
wherein solving the fifth mixed integer program assignment model results in a fifth hand-off constraint;
the assignment model solving the sixth mixed integer program assignment model using a sixth set of constraints;
wherein the objective of the sixth mixed integer program assignment model is minimizing the number of uncovered trips that have a length of three days;
wherein the sixth set of constraints comprises the fifth set of constraints and the fifth hand-off constraint; and
wherein solving the sixth mixed integer program assignment model results in a sixth hand-off constraint;
the assignment model solving the seventh mixed integer program assignment model using a seventh set of constraints;
wherein the objective of the seventh mixed integer program assignment model is minimizing the number of uncovered trips that have a length of two days;
wherein the seventh set of constraints comprises the sixth set of constraints and the sixth hand-off constraint; and
wherein solving the seventh mixed integer program assignment model results in a seventh hand-off constraint;
and
the assignment model solving the eighth mixed integer program assignment model using an eighth set of constraints;
wherein the objective of the eighth mixed integer program assignment model is minimizing the number of uncovered trips that have a length of one day; and
wherein the eighth set of constraints comprises the seventh set of constraints and the seventh hand-off constraint;
wherein the first optimum solution includes:
a number of unassigned shifts having the status of uncovered; and
a number of required moveable days;
wherein a moveable day is a day associated with a crewmember of the plurality of crewmembers working while the crewmember is designated as a reserve;
after generating the first optimum solution, the assignment model of the schedule application generating, using the set of rules, the plurality of shift bids, the plurality of unassigned shifts, and the first optimum solution, the transparent optimized shift schedule for the plurality of crewmembers;
wherein the transparent optimized shift schedule comprises:
a listing of shifts, with each shift being either assigned a crewmember from the plurality of crewmembers or unassigned having a status of uncovered; and
a reason code associated with each rejected shift bid from the plurality of shift bids;
wherein generating the transparent optimized shift schedule for the plurality of crewmembers comprises:
the schedule application identifying foreign language crewmembers that satisfy a foreign language requirement from the plurality of crewmembers;
the schedule application identifying foreign-language-required unassigned shifts that must be assigned to a foreign language crewmember from the plurality of unassigned shifts;
for each foreign language crewmember, the schedule application identifying legal, unassigned shifts, from the plurality of foreign-language-required unassigned shifts, that satisfy the set of rules associated with the each foreign language crewmember;
the schedule application ranking the foreign language crewmembers according to seniority; and
starting with the most senior foreign language crewmember and for each less-senior foreign language crewmember thereafter:
the schedule application matching legal, unassigned shifts associated with the foreign language crewmember to shift bids of the most senior foreign language crewmember;
the bid award model determining whether the legal, unassigned shift that matched with a shift bid of the most senior foreign language crew member would increase the number of moveable days of the first optimum solution if awarded;
the bid award model classifying the legal, unassigned shift that matched with the shift bid of the most senior foreign language crew member as a rejected shift bid when the award of the legal, unassigned shift would increase the number of required moveable days of the first optimum solution;
the bid award model generating a reason code for the rejected shift bid indicating that the rejected shift bid was rejected because it would have increased the number of required moveable days of the first optimum solution;
the bid award model storing the reason code for the rejected shift bid indicating that the rejected shift bid was rejected because it would have increased the number of required moveable days of the first optimum solution in the at least one memory unit;
the bid award model determining whether the legal, unassigned shift that matched with the shift bid of the most senior foreign language crew member would increase the number of unassigned shifts of the optimum solution having the status of uncovered;
the bid award model classifying the legal, unassigned shift that matched with the shift bid of the most senior foreign language crew member as a rejected shift bid, when the award of the legal, unassigned shift would increase the number of unassigned shifts of the optimum solution having the status of uncovered;

the bid award model generating a reason code for the rejected shift bid indicating that the rejected shift bid was rejected because it would increase the number of unassigned shifts of the optimum solution having the status of uncovered;

the bid award model storing the reason code for the rejected shift bid indicating that the rejected shift bid was rejected because it would increase the number of unassigned shifts of the optimum solution having the status of uncovered in the at least one memory unit; and the bid award model awarding the legal, unassigned shift that matched with the shift bid of the most senior foreign language crew member to the most senior foreign language crewmember after determining that the legal, unassigned shift that matched with the shift bid of the most senior foreign language crew member would not increase the number of required moveable days of the first optimum solution and that the legal, unassigned shift that matched with the shift bid of the most senior foreign language crew member would not increase the number of unassigned shifts of the optimum solution having the status of uncovered;

the schedule application sending the transparent optimized shift schedule to the crew management system; and the crew portal web site displaying a reason why a rejected shift bid was rejected.

8. The apparatus of claim 7, wherein the instructions are executed with the at least one processor so that the following additional steps are executed:

the schedule application determining, for each foreign language crewmember, a crewmember's availability in days;

the schedule application grouping the foreign language crewmembers into groups based on the crewmembers' availability in days;

the schedule application determining whether the legal, unassigned shift that matched with the shift bid of the most senior foreign language crew member has a number of days that is greater than the most senior foreign language crewmember's availability;

if the legal, unassigned shift that matched with the shift bid of the most senior foreign language crew member has a number of days that is greater than the most senior foreign language crewmember's availability, then the trip group release model solving a first mathematical model to determine whether the legal, unassigned shift that matched with the shift bid of the most senior foreign language crew member, if awarded, would increase a number of crewmembers in his or her group that does not have an assigned shift;

the bid award model classifying the shift bid associated with the most senior foreign language crewmember as a rejected shift bid when, if awarded, the shift bid would increase the number of crewmembers in his or her group that does not have an assigned shift;

the bid award model generating a reason code for the rejected shift bid indicating that the rejected shift bid was rejected because it would increase the number of crewmembers in his or her group that does not have an assigned shift;

the bid award model storing the reason code for the rejected shift bid indicating that the rejected shift bid was rejected because it would increase the number of crewmembers in his or her group that does not have an assigned shift;

the schedule application determining whether the legal, unassigned shift that matched with the shift bid of the most senior foreign language crew member has a number of days that is less than the most senior foreign language crewmember's availability;

if the legal, unassigned shift that matched with the shift bid of the most senior foreign language crew member has a number of days that is less than the most senior foreign language crewmember's availability, then the crew group release model solving a second mathematical model to determine whether the legal, unassigned shift that matched with the shift bid of the most senior foreign language crew member, if awarded, would increase a number of unassigned shifts having the status of uncovered in his or her group;

the bid award model classifying the shift bid associated with the most senior foreign language crewmember as a rejected shift bid when, if awarded, the shift bid would increase the number of unassigned shifts having the status of uncovered in his or her group;

the bid award model generating a reason code for the rejected shift bid indicating that the rejected shift bid would increase the number of unassigned shifts having the status of uncovered in his or her group; and the bid award model storing the reason code for the rejected shift bid indicating that the rejected shift bid was rejected because it would increase the number of unassigned shifts having the status of uncovered in his or her group;

wherein awarding the legal, unassigned shift that matched with the shift bid of the most senior foreign language crew member to the most senior foreign language crewmember is further after determining that the award of the shift bid would not increase the number of crewmembers in his or her group that do not have an assigned shift and would not increase the number of unassigned shifts having the status of uncovered in his or her group.

9. The apparatus of claim 8, wherein the instructions are executed with the at least one processor so that the following additional steps are executed:

the schedule application generating an eighth constraint function when the shift bid associated with the most senior foreign language crewmember is awarded to reflect that the legal, unassigned shift that matched with the shift bid of the most senior foreign language crew member is an awarded shift; and the schedule application generating a second optimum solution by solving a plurality of mixed integer program assignment models in an hierarchical order using the first constraint function to reflect that the legal, unassigned shift that matched with the shift bid of the most senior foreign language crew member is an awarded shift, wherein the second optimum solution has the same number of shifts having the status of uncovered, and the same number of required moveable days, as the first optimum solution.

10. The apparatus of claim 7, where each shift bid from the plurality of shift bids that is submitted by a crewmember includes one of the following: a preference requesting that the crewmember remain on call; a preference requesting a shift with fewer days than the crewmember's availability; a preference requesting a shift with more days than the crewmember's availability; a preference requesting a shift with equal days as the crewmember's availability; a preference requesting a shift designated as an international premium shift; a preference requesting an on-premise-reserve shift with fewer days than the crewmember's availability; a preference requesting an on-premise-reserve shift with more days than the crewmember's availability; a preference requesting an on-premise-reserve shift with equal days as the crewmember's availability; and a preference requesting a trip that is not a foreign-language-required unassigned trip when the crewmember is a crewmember that satisfies a foreign language requirement.

11. The apparatus of claim 7, wherein each crewmember from the plurality of crewmembers is an airline crewmember and is classified into one of the following: a first group of crewmembers, the crewmembers in the first group satisfying a foreign language requirement and being required to be assigned an unassigned shift; a second group of crewmembers, the crewmembers in the second group satisfying a foreign language requirement, not being required to be assigned an unassigned shift, but having submitted a shift bid; a third group of crewmembers, the crewmembers in the third group not satisfying a foreign language requirement and being required to be assigned an unassigned shift; and a fourth group of crewmembers, the crewmembers in the fourth group not satisfying a foreign language requirement, not being required to be assigned an unassigned shift, but having submitted a shift bid.

12. The apparatus of claim 11, wherein the schedule application generating the optimized shift schedule for the plurality of crewmembers comprises:
the schedule application sorting the first, second, third, and fourth groups in an hierarchal arrangement; and
the schedule application generating, in succession and based on the hierarchal arrangement, at least a portion of the optimized shift schedule for each of the first, second, third, and fourth groups thereby allowing the reason codes to be associated with the rejected shift bids and presented to the crewmembers associated with the rejected shift bids.

13. The method of claim 1, further comprising:
the crew portal presenting to each crewmember from the plurality of crewmembers his or her shift assignment from the transparent optimized shift schedule; and
the crew portal presenting, to each crewmember from the plurality of crewmembers who submitted a shift bid classified as a rejected shift bid, the reason code associated with his or her rejected shift bid;
wherein the crew portal presenting, to each crewmember from the plurality of crewmembers who submitted a shift bid classified as a rejected shift bid, his or her shift assignment from the optimized shift schedule and the reason code associated with his or her rejected shift bid provides transparency as to why each rejected shift bid was rejected.

14. The apparatus of claim 7, wherein the instructions are executed with the at least one processor so that the following additional steps are executed:
the crew portal presenting to each crewmember from the plurality of crewmembers his or her shift assignment from the transparent optimized shift schedule; and
the crew portal presenting, to each crewmember from the plurality of crewmembers who submitted a shift bid classified as a rejected shift bid, the reason code associated with his or her rejected shift bid;
wherein the crew portal presenting, to each crewmember from the plurality of crewmembers who submitted a shift bid classified as a rejected shift bid, his or her shift assignment from the optimized shift schedule and the reason code associated with his or her rejected shift bid provides transparency as to why each rejected shift bid was rejected.

\* \* \* \* \*